United States Patent
Hanaoka et al.

(10) Patent No.: US 12,497,001 B2
(45) Date of Patent: Dec. 16, 2025

(54) INFORMATION PROCESSING APPARATUS, PROGRAM, COMPUTER READABLE RECORDING MEDIUM, AND INFORMATION PROCESSING METHOD

(71) Applicant: Nissan Motor Co., Ltd., Kanagawa (JP)

(72) Inventors: Miyuki Hanaoka, Kanagawa (JP); Keiichi Unno, Kanagawa (JP); Kiron Tsang, Kanagawa (JP); Junichiro Murata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 655 days.

(21) Appl. No.: 17/425,570

(22) PCT Filed: Dec. 12, 2019

(86) PCT No.: PCT/IB2019/001360
§ 371 (c)(1),
(2) Date: Jul. 23, 2021

(87) PCT Pub. No.: WO2020/152496
PCT Pub. Date: Jul. 30, 2020

(65) Prior Publication Data
US 2022/0089127 A1    Mar. 24, 2022

(30) Foreign Application Priority Data

Jan. 25, 2019    (JP) .................................. 2019-010797

(51) Int. Cl.
*B60R 25/31*    (2013.01)
*B60R 25/01*    (2013.01)
(Continued)

(52) U.S. Cl.
CPC .............. *B60R 25/31* (2013.01); *B60R 25/01* (2013.01); *G06T 7/0002* (2013.01); *G06V 10/16* (2022.01); *G06V 20/50* (2022.01)

(58) Field of Classification Search
CPC ....... B60R 25/31; B60R 25/01; G06T 7/0002; G06V 10/16; G06V 20/50; G06Q 10/20; G06Q 30/0645; G06Q 50/40; G06Q 10/02
See application file for complete search history.

(56) References Cited

U.S. PATENT DOCUMENTS 9,520,006 B1 * 12/2016 Sankovsky .............. G07C 5/02
9,682,683 B2 *  6/2017 Williams ................ H04W 4/40
(Continued)

FOREIGN PATENT DOCUMENTS

CN    103661245 A    3/2014
CN    106792431 A    5/2017
(Continued)

OTHER PUBLICATIONS

JP 2003233412 English translation (espacenet) (Year: 2024).*
JP_2003233412 with translation (Year: 2025).*

*Primary Examiner* — Jelani A Smith
*Assistant Examiner* — Paul A Castro
(74) *Attorney, Agent, or Firm* — Osha Bergman Watanabe & Burton LLP

(57) ABSTRACT

An information processing apparatus includes a detection unit, an inspection information acquirement unit, and an information provision unit. The detection unit detects a user approaching a vehicle based on receiving a predetermined signal from the vehicle or an unlocking operation on the vehicle. The inspection information acquirement unit acquires inspection information including an inspection item of the vehicle and relating to an inspection of the vehicle. The information provision unit performs, based on detection (Continued)

of the user approaching the vehicle by the detection unit, a process to provide the inspection information of an approaching vehicle to the user. The approaching vehicle is the vehicle that the user has approached.

16 Claims, 16 Drawing Sheets

(51) Int. Cl.
   *G06T 7/00* (2017.01)
   *G06V 10/10* (2022.01)
   *G06V 20/50* (2022.01)

(56) References Cited

U.S. PATENT DOCUMENTS

| | | |
|---|---|---|
| 2012/0040612 A1 | 2/2012 | Lee et al. |
| 2017/0098176 A1 | 4/2017 | Hirose et al. |
| 2018/0060742 A1* | 3/2018 | Penilla .................. G06F 9/451 |
| 2019/0121353 A1* | 4/2019 | Datema ................. B28C 5/422 |
| 2020/0184739 A1* | 6/2020 | Nathan .................. G06Q 10/20 |

FOREIGN PATENT DOCUMENTS

| | | | |
|---|---|---|---|
| DE | 102013015718 A1 | | 3/2015 |
| JP | 2003233412 A | * | 8/2003 |
| JP | 2005-186659 A | | 7/2005 |
| JP | 2010-202043 A | | 9/2010 |
| JP | 2012-043396 A | | 3/2012 |
| JP | 2017-111081 A | | 6/2017 |
| JP | 2018-079883 A | | 5/2018 |
| WO | 2015/141291 A1 | | 9/2015 |

\* cited by examiner

INFORMATION PROCESSING APPARATUS, PROGRAM, COMPUTER READABLE RECORDING MEDIUM, AND INFORMATION PROCESSING METHOD

TECHNICAL FIELD

The present disclosure relates to information processing apparatus, programs, computer readable recording medium, and information processing method.

This application claims priority to Japanese Patent Application No. 2019-10797, filed Jan. 25, 2019, and for designated countries in which reference to a document is permitted, the content set forth in the above application is incorporated herein by reference and is incorporated by reference as part of this application.

BACKGROUND ART

A transport inspection head mount display is known which includes a display apparatus capable of generating a stereoscopic view image, a depth sensor for measuring a distance to an object, an imaging apparatus for acquiring information of the vehicle, and a control unit for controlling the display of the display apparatus according to the operation of the object by the depth sensor (Patent Document 1). The control unit acquires the information of the vehicle and displays inspection item of the vehicle on the display apparatus in response to the movement of the object by the depth sensor. The transmitting unit transmits the result of inspection item to the external recording unit in response to the movement of the object. This head mount display for transport inspection is intended for inspection of vehicles in the transport industry. The transport operator attaches the transport inspection head mount display to start the inspection operation. The transport operator must perform a specific action of visually recognizing the license plate of the transport vehicle and touching the virtual image display area of the license plate by hand.

PRIOR ART DOCUMENT

Patent Document

[Patent Document 1] JP2017-111081A

SUMMARY OF INVENTION

Problems to be Solved by Invention

However, the above-mentioned prior art has a problem in that only a small number of users who recognize the necessity of the inspection operation and know the above-mentioned specific operation perform the inspection operation.

An object of the present invention is to provide an information processing apparatus, a program, a computer readable recording medium, and an information processing method which enable an unspecified number of users to carry out an inspection operation.

Means for Solving Problems

The present invention solves the above-described problem by acquiring inspection information relating to inspection of a vehicle, including inspection item of a vehicle, detecting that the user has approached the vehicle at a predetermined distance or less, and executing a process so as to provide the user with an inspection information relating to approaching vehicle that is the vehicle approached by the user based on detecting the user approaching the vehicle.

Effect of Invention

Since inspection information on approaching vehicle is provided to the user based on the detection of the user approaching the vehicle, an unspecified number of users can perform the inspection operation.

MODE(S) FOR CARRYING OUT THE INVENTION

Hereinafter, an embodiment of an information processing apparatus, a program, a computer-readable recording apparatus, and an information processing method according to the present invention will be described with reference to the drawings. In the present embodiment, an information processing apparatus mounted on a terminal owned by a user will be exemplified and described.

Figure 1:
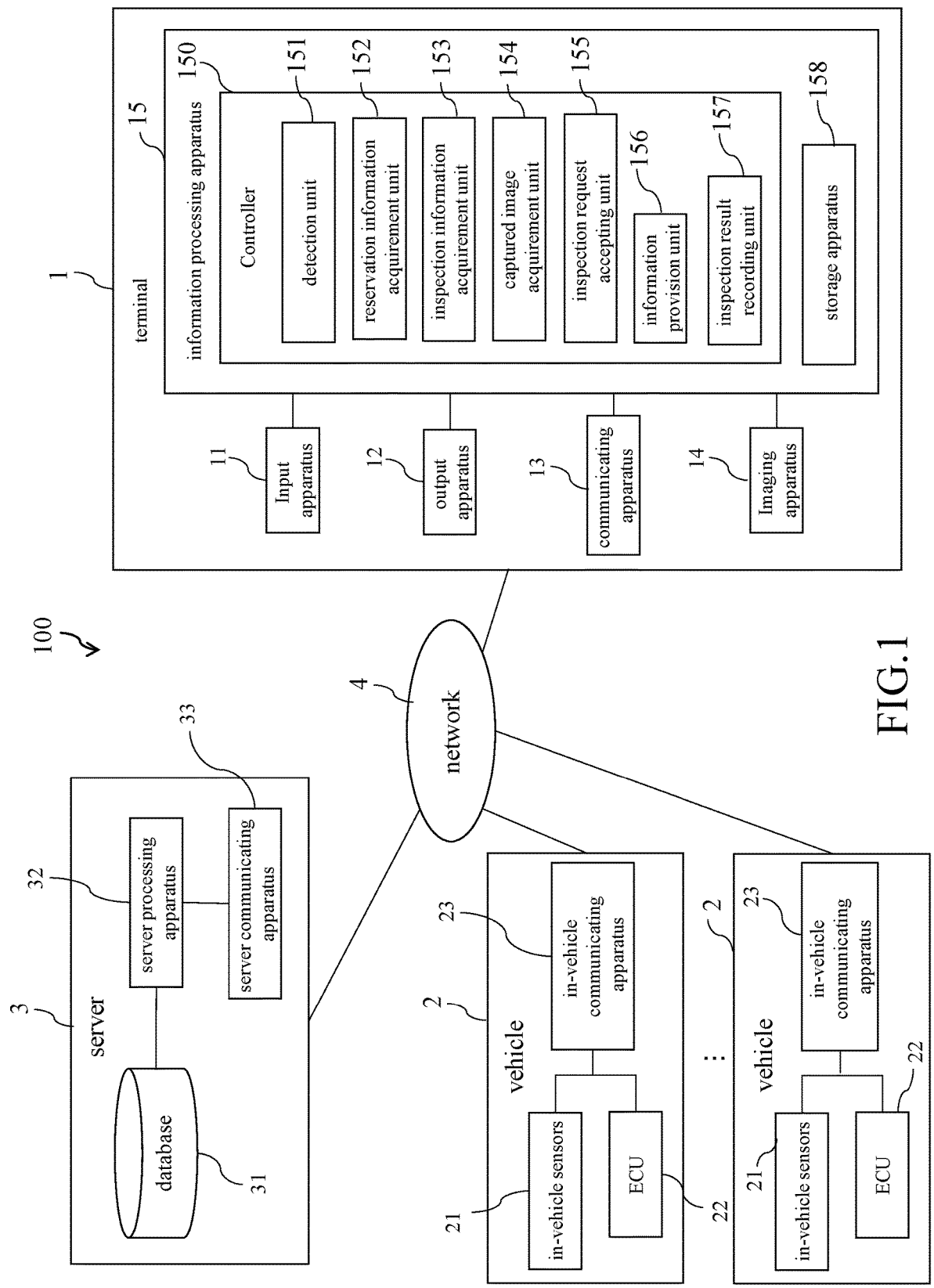
FIG. 1 is a block diagram illustrating an exemplary inspection system of a vehicle according to the present embodiment.

FIG. 1 is a block diagram of an exemplary inspection system 100 of a vehicle including an information processing apparatus 15 in accordance with the present invention. As shown in FIG. 1, a vehicle inspection system 100 according to the present embodiment includes a terminal 1, a plurality of vehicles 2, servers 3, and a network 4 constituting a telecommunication network. The system of the present embodiment is a inspection system of a vehicle targeted for a vehicle used by an unspecified number of users, and the system provides a inspection information related to the inspection of the vehicle to a terminal, and causes the user to perform the inspection operation. In addition, the system of the present embodiment provides a service that presents information which is intuitive to the user using the AR (Augment Reality) art.

Though not particularly limited, the scene to which the system of the present embodiment is applied includes, for example, inspection of a specific vehicle in a system in which a specific vehicle is shared among registered members (so-called car sharing), or inspection of a robot taxi in a system in which an automatic driving vehicle such as a robot taxi is dispatched to a point designated by a user. The system of the aforementioned embodiment can be applied not only to a system targeting vehicles used by an unspecified number of users, such as the above-mentioned car sharing or robot taxi, but also to inspection of vehicles used by a specific user, such as a vehicle owned by the user, for example.

The system according to one or more embodiments of the present invention will be described on the assumption that a number of persons who can be the users own the terminal 1 or uses the terminal 1 on a daily basis. Examples of this type of terminals 1 for use include smartphones, mobile phones, and portable computers. The terminal 1 will be described later.

Next, the vehicle 2 will be described. The vehicle 2 may be any of a general automobile with a navigation apparatus and operated by a human, an automobile with the navigation apparatus and an autonomous travel control system (speed control and steering control system), or an automobile with the navigation apparatus and the autonomous travel control system under unmanned operation. In the following embodiments, a description will be given by taking as an example a vehicle that is shared among users that satisfy specific requirements and that is driven by the user with a navigation apparatus mounted thereon. In the following embodiments, the vehicle is assumed to be under the following conditions. The vehicle is shared among users who satisfy specific requirements. The vehicle has navigation apparatus and is driven by the user. A plurality of the vehicles are available by the user and standby at a plurality of standby stations. The standby station is a place for vehicles 2 which are not being used by users to wait, or a place on which vehicles 2 can be parked.

The vehicle 2, as shown in FIG. 1, comprises the in-vehicle sensors 21, a ECU22, and an in-vehicle communicating apparatus 23. The apparatuses included in the vehicle 2 are connected to each other by CAN (Controller Area Network) or another in-vehicle LAN in order to exchange data with each other. In the following description, information exchanged between the apparatuses of the vehicle 2 is referred to as CAN data.

The in-vehicle sensors 21 are devices for acquiring information indicating the present state of the vehicle 2. The state of the vehicle 2 includes a state of the vehicle 2 that can be determined by the user through visual recognition and a state of the vehicle 2 that cannot be determined by the user through visual recognition. In-vehicle sensors 21 include, for example, a tire pressure sensor for detecting the air pressure or thermal of the tire, a water temperature sensor for detecting the temperature of the cooling water of the engine, an oil temperature sensor for detecting the temperature of the engine oil, or a liquid level sensor for detecting the water level of window washer fluid/brake liquid/cooling water of an engine/engine oil. Information acquired by the in-vehicle sensors 21 is outputted to ECU22 and the in-vehicle communicating apparatus 23. The information acquired by the in-vehicle sensors 21 is, for example, the air pressure of the tire, the temperature of the tire, the temperature of the cooling water of the engine, the temperature of the engine oil, or the water level of the cooling water/engine oil of window washer fluid/brake liquid/cooling water of an engine/engine oil. In the following explanation, the information acquired by the in-vehicle sensors 21 is referred to as vehicle information.

ECU22 is an in-vehicle computer called an electronic control unit 22. ECU22 has a self-diagnosis function for detecting that an abnormality has occurred in the vehicle 2, and a vehicle information transmitting function for transmitting the vehicle information acquired by the in-vehicle sensors 21 to the terminal 1.

ECU22 can detect abnormalities of the vehicles 2 by the self-diagnosis function. Abnormalities of the vehicle 2 include not only failures (inoperable states) of various sensors (the in-vehicle sensors 21), various components, various mechanisms, and various systems mounted on the vehicle 2, but also these failures (those that are operable but not operating within the normal range). For example, ECU22 detects the occurrence of an abnormality about various sensors and actuators constituting the braking mechanism based on the input information from the in-vehicle sensors 21. When detecting that an abnormality has occurred in the vehicle 2, ECU22 displays Diagnostic Trouble Code (DTC) set in advance according to the type of the abnormality on a instrument panel (not shown). Thus, the occupant of the vehicle 2, is possible to know that an abnormality has occurred in the vehicle 2 and the type of the occurred abnormality. In addition, ECU22 transmits the information on Diagnostic Trouble Code provided to the occupants of the vehicle 2 to the terminal 1 and the server 3 via the in-vehicle communicating apparatus 23, which will be described later.

Further, ECU22, by the vehicle information transmitting function, via the in-vehicle communicating apparatus 23, transmits the vehicle information acquired by the in-vehicle sensors 21 described above to the terminal 1. The vehicle information includes the air pressure of the tire described above and the like. When an abnormality of the vehicle 2 is detected by the self-diagnosis function, ECU22 transmits the vehicle information to the terminal 1 in addition to the information on Diagnostic Trouble Code provided to the occupant of the vehicle 2. When receiving request signal of the vehicle information from the terminal 1, ECU22 transmits the vehicle information to the terminal 1. Request signal of the vehicle information is a signal for the terminal 1 to acquire the vehicle information, that is, a signal for instructing the vehicle 2 to transmit the vehicle information. Vehicle information is provided to the user via the terminal 1 during the inspection operation of the vehicle 2.

It is assumed that the information transmitted from the vehicle 2 (including the information on Diagnostic Trouble Code and the vehicle information described above) including the unlocking information of the doors and the user certification information described later includes the identification information of the vehicle 2 (such as a manufacturer, a vehicle family, a license plate, and other registered information in the car sharing system). As a result, the terminal 1 or the server 3 can specify the vehicle 2 from which the information is transmitted.

The in-vehicle communicating apparatus 23 is an apparatus capable of communicating with the terminal 1 and the servers 3 via the networks 4. The in-vehicle communicating apparatus 23 receives the information from the terminal 1 or the server 3, outputs the information to ECU22, and transmits the information input from ECU22 to the terminal 1 or the server 3. The in-vehicle communicating apparatus 23 is, for example, an apparatus having a 4G LTE mobile communication function or an apparatus having a Wi-Fi communication function.

Next, the server 3 will be described. The server 3 includes a database 31, a server processing apparatus 32, and a server communicating apparatus 33, as shown in FIG. 1. Each apparatus included in the server 3 can exchange information with each other via a wired or wireless communication line.

The database 31 stores information on the car sharing system, the inspection item lists of the vehicles 2, and inspection results indicating the results confirmed by the user for each inspection item. The information stored in the database 31 will be described below.

The information on the car sharing system is information necessary when the user uses the car sharing system. The information on the car sharing system includes registration information of the user and reservation information of the vehicle 2. The user registration information includes, for example, the user's membership ID, the user's name and address, and the user's usage history of the car sharing system. The reservation information of the vehicle 2 includes, for example, identification information (a manufacturer, a vehicle family, a color, a license plate, etc.) of the vehicle 2 reserved by the user, the name of the station where the vehicle 2 is waiting, the place of the station, the time scheduled for use by the user, and the like.

An inspection item list for the vehicle 2 is a list of inspection item prepared in advance for each type of the vehicle 2. The number of inspection items included in the inspection item list is not particularly limited, and at least one number may be included in the list. The inspection item lists differ for each type of vehicle, such as sedans, minivans, etc. The type of a vehicle is classified according to a manufacturer, a vehicle family, a vehicle body shape or a usage pattern of the vehicle 2. Although the display format of the inspection item list is not particularly limited, the inspection item list is represented by a hierarchical structure such as, for example, large items, medium items, and small items. Here, each inspection item is assigned an inspection number indicating the inspection order. The inspection number stored in the database 31 is a number corresponding to the recommended inspection sequence set in advance. The information processing apparatus 15, which will be described later, can change the inspection order by changing the inspection number to any number.

In the present embodiment, the inspection item list of the vehicle 2 is stored in the data base 31 of the server 3, but the inspection item list of the vehicle 2 is not limited to the server 3 and may be stored in the vehicle 2. In this case, the plurality of vehicles 2 store the inspection item list corresponding to the vehicle family and the like of each vehicle 2 in advance. When the inspection item list is stored in the vehicle 2, the terminal 1 receives the inspection item list from the vehicle 2. Examples of receiving the inspection item list from vehicles 2 will be described later.

The inspection item list is associated with an inspection procedure of predetermined recommends for each inspection item. The inspection procedure is a setup for performing an inspection operation, and is a so-called inspection operation manual. The inspection procedure is expressed so that even a user who has no experience of performing an inspection operation or does not have any experience of performing an inspection operation can perform the inspection operation by performing the operation according to the inspection procedure. In addition, the inspection procedure varies according to the type of vehicle. The type of the vehicle is classified by the manufacturer, vehicle family, vehicle body shape or usage pattern of the vehicle 2. The inspection procedure differs according to the type of the component to be inspected or according to the specifications of the component.

The inspection item lists are associated with a content to be confirmed by the user (also referred to as a judgment criterion for the user to judge whether or not there are problems) for each inspection item. The display format of the confirmation content is not particularly limited. For example, when there is an inspection item in which the user has to confirm numeric value, the content to be confirmed is displayed as a numeric value indicating the normal range. Further, for example, in inspection item in which the user needs to confirm the pattern and the color, the confirmation content is displayed by images indicating the pattern and the color in the normal state and the abnormal state. Each inspection item has an associated content to be verified by the user, allowing the user to perform a confirmation operation of each inspection item according to the content to be confirmed.

The inspection item list will be described by exemplifying the inspection of tires. For example, "tire" is assigned to the main item of the inspection item list, and "tire air pressure" and "tire tread pattern" are assigned to the middle item of the list. The item of "tire air pressure" is associated with, for example, information as the inspection procedure: (1) photographing the tire with an imaging apparatus 14 of the terminal 1, (2) referring to the confirmation content when the numeric value indicating the tire air pressure is displayed on the terminal 1, and determining whether or not there are any problems in the present tire air pressure, and (3) touching "OK" or "NG" displayed in the item of the confirmation result. The item "tire air pressure" is associated with, for example, information on tire air pressure (e.g., –[kPa]) in the normal range as the confirmation content. When such information is provided to the user, even if the vehicle 2 is of a type different from the vehicle owned by the user, the user can smoothly perform the inspection operation of the "tire pressure" according to the inspection procedure. Also, even a user who has no knowledge of tire pressure can determine whether there is a problem with the current tire pressure by simply comparing the current tire pressure with the normal range of tire pressure.

In addition, the item "tire tread pattern" is associated with, for example, information as the inspection procedure such as: (1) photographing the tire with the imaging apparatus 14 of the terminal 1, (2) referring to the confirmation content when the tread pattern of the tire is displayed on the terminal 1, and determining whether there are problems in the tread pattern of the present tire, and (3) touching "OK" or "NG"

displayed in the item of the confirmation result. The item "tire tread pattern" is associated with, for example, a tread pattern of a tire in a normal state and a tread pattern of a tire in an abnormal state, which are stored in advance as confirmation contents. When such information is provided to the user, even the user who has not experienced the inspection operation can smoothly perform the inspection operation of the "tire tread pattern" according to the inspection procedure. In addition, even if it is difficult to judge whether or not there is a problem at first glance, such as "the tread pattern of the tire", the user can easily judge whether or not there is a problem in the tread pattern of the current tire only by comparing the tread pattern of the current tire with the tread pattern of the tire in the normal state and the abnormal state.

The inspection result is information of the user's inspection result corresponding to inspection item. The display format of the inspection result is not particularly limited. The inspection result includes vehicle information for each inspection item in addition to the confirmation result by the user. This vehicle information is information indicating the present state of the vehicle 2 acquired by the in-vehicle sensors 21. For example, the inspection result of inspection item "tire air pressure" is associated with the air pressure (numerical value) of the tire when the user confirms, in addition to the confirmation result by the user (for example, "OK" or "NG").

Next, a server processing apparatus 32 will be described. The server processing apparatus 32 is a processor that executes processing related to the operation of the car sharing system and processing related to the inspection of the vehicle 2 in accordance with information transmitted from the terminal 1.

The processing related to the operation of the car sharing system is, for example, transmission of reservation information of the vehicle 2 to the terminal 1. For example, when a signal requesting reservation information of the vehicle 2 is outputted from the terminal 1 to the server processing apparatus 32, the server processing apparatus 32 accesses the data base 31 to acquire corresponding reservation information, and transmits the acquired reservation information to the terminal 1.

The processes relating to the inspection of the vehicle 2 are, for example, sending the inspection item list of the vehicle 2 to the terminal 1, and recording the inspection result of the vehicle 2 to the database 31. For example, when outputting the signal for requesting the inspection item from the terminal 1 to the server processing apparatus 32, the server processing apparatus 32 accesses the database 31 to acquire the corresponding inspection item list, and transmits the acquired inspection item list to the terminal 1. Further, for example, when the inspection result of the vehicle 2 is outputted from the terminal 1 to the server processing apparatus 32, the server processing apparatus 32 records the inspection result of the vehicle 2 in the data base 31.

The server communicating apparatus 33 is an apparatus capable of communicating with the terminal 1 and the vehicle 2 via the network 4. The server communicating apparatus 33 outputs information received from the terminal 1 or the vehicle 2 to the server processing apparatus 32, and transmits information inputted from the server processing apparatus 32 to the terminal 1 or the vehicle 2.

Next, configuration of the terminal 1 will be described. As shown in FIG. 1, the terminal 1 comprises an input apparatus 11, an output apparatus 12, a communication apparatus 13, an imaging apparatus 14, and the information processing apparatus 15.

The input apparatus 11 is an apparatus operated by the user. The input apparatus 11 is used, for example, to start an application for car sharing or vehicle inspection, select information to be provided to the user, and perform various operations such as determination by the user. The input apparatus 11 may be, for example, a touch panel disposed on a display, buttons disposed on a keyboard, or an apparatus capable of input by a user's hand operation, such as a joystick. Alternatively, the input apparatus 11 may be an apparatus such as a microphone capable of inputting speech by a user. Input information from the user input by the input apparatus 11 is output to the information processing apparatus 15.

The output apparatus 12 is an apparatus for providing information to the user. For example, the output apparatus 12 is used for display on a screen and guidance by voice. The information output from the information processing apparatus 15 is input to the output apparatus 12. The output apparatus 12 provides information from the information processing apparatus 15 to the user. The output apparatus 12 may be, for example, an apparatus such as a display capable of outputting an image or video that acts on the user's vision. Alternatively, the output apparatus 12 may be, for example, an apparatus such as a speaker capable of outputting sound acting on the hearing of the user. The types of the display and the speaker are not particularly limited. The output apparatus 12 may also include an attached apparatus for informing provision of information. The attached apparatus includes, for example, a vibration apparatus (also referred to as a vibrator) capable of outputting a signal that acts on the user's tactile sense, or an alarm device that outputs an alarm. Such an attached apparatus acts as a trigger for presenting information. For example, even if terminal 1 is in the user's bag or in the user's clothing pocket, the user may know that some information is being provided.

The communication apparatus 13 is an apparatus that communicates with the vehicle 2 and the server 3 via the network 4. The communication apparatus 13 exchanges, for example, information on vehicle information with the vehicle 2. For example, when request signal for acquiring the vehicle information is output from the information processing apparatus 15 to the communication apparatus 13, the communication apparatus 13 transmits request signal for acquiring the vehicle information to the vehicle 2. Further, for example, when the vehicle information corresponding to request signal is transmitted from the vehicle 2 to the communication apparatus 13, the communication apparatus 13 outputs the vehicle information to the information processing apparatus 15.

In addition, for example, the communication apparatus 13 exchanges reservation information of the vehicle 2 and information on the inspection item list of the vehicle 2 with the server 3. For example, when the information processing apparatus 15 outputs a request signal for acquiring the reservation information or the inspection item list to the communication apparatus 13, the communication apparatus 13 transmits the request signal to the server 3. Further, for example, when the reservation information or the inspection item list corresponding to the request signal is transmitted from the server 3 to the communication apparatus 13, the communication apparatus 13 outputs the reservation information or the inspection item list to the information processing apparatus 15.

The imaging apparatus 14 is an apparatus capable of capturing an image of the surroundings of the terminal 1 by a user's manipulation. The imaging apparatus 14 is, for example, a camera having an image pickup device such as a CCD. The type of the camera is not particularly limited and may be an infrared camera or a stereo camera. The user's operation information is input to the imaging apparatus 14 via the input apparatus 11. The imaging apparatus 14 shoots a still image or shoots a video in response to operational data. Although not particularly limited, the imaging apparatus 14 preferably has a function capable of optical zooming or digital zooming. The imaging apparatus 14 outputs captured image to the information processing apparatus 15. Captured images captured by the imaging apparatus 14 include both still images and moving images.

The information processing apparatus 15 of the present embodiment comprises a computer equipped with hardware and software. The information processing apparatus 15 includes ROM (Read Only Memory) storing a program, CPU (Central Processing Unit) for executing a program stored in the ROM, and RAM (Random Access Memory) that functions as an accessible storage apparatus. As the operation circuits, MPU (Micro Processing Unit), DSP (Digital Signal Processor), ASIC (Application Specific Integrated Circuit) and FPGA(Field Programmable Gate Array) can be used instead of or in addition to CPU. The controller 150 shown in FIG. 1 corresponds to CPU. The storage apparatus 158 shown in FIG. 1 corresponds to ROM and RAM.

As shown in FIG. 1, the controller 150 includes a detection unit 151, a reservation information acquirement unit 152, a inspection information acquirement unit 153, a captured image acquirement unit 154, an inspection request accepting unit 155, an information provision unit 156, and an inspection result recording unit 157. These blocks realize the functions described later by the software established in ROM.

The function of the detection unit 151 will be described. The detection unit 151 detects, at least, that the user has approached the vehicle 2 a predetermined distance or less. In the present embodiment, the detection unit 151 detects that the user has been away from the vehicle 2 by a predetermined distance or more in addition to the user approaching the vehicle 2. The predetermined distance used for detection of the user approaching and the predetermined distance used for detection of the user being away are distances set based on experimental results. The two distances may have the same value or different values.

The method of detecting the user approaching the vehicle 2 is, for example, a method of using information on the unlocking of the door of the vehicle 2 or information on the authentication process of the user, or a method of using the positional information of the terminal 1 and the vehicle 2. In the following description, the terminal 1 is assumed to be owned by the user, and the current position of the terminal 1 is assumed to be the current position of the user.

An example of a method of detecting the user approaching will be described. For example, the detection unit 151 detects the user approaching the vehicle 2 based on the unlocking information of the doors of the vehicle 2 or the information relating to the user's authenticating process. In a car sharing system, from the viewpoint of security, it is common to authenticate in advance whether or not the user uses the vehicle 2 before using the vehicle 2. As an authentication apparatus, a user authentication apparatus capable of communicating with NFC (Near Field Communication) is exemplified. For example, it is assumed that such a user authentication apparatus is mounted on the vehicle 2. When the user holds the member card of the car sharing system over the user authentication apparatus, the user authentication apparatus reads the user ID information. Then, when the user authentication apparatus has confirmed that the user who uses the vehicle 2 holds the member card, the door of the vehicle 2 is automatically unlocked. At this time, the detection unit 151 acquires the unlocking information of the door indicating that the door has been unlocked or the user authentication information indicating that the user authentication process has been completed from the vehicle 2. Thus, the detection unit 151 can detect the user approaching the vehicle 2.

Another example of the method of detecting the user approaching the vehicle 2 will be described. The detection unit 151 may detect the user approaching the vehicle 2 based on the position information of the vehicle 2 and the position information of the terminal 1. For example, the detection unit 151 estimates the positional relationship between the vehicle 2 and the terminal 1, when the estimated positional relationship satisfies a predetermined requirement, it may be determined that the user approaches the vehicle 2, to detect the user approaching the vehicle 2. The predetermined requirement is, for example, that the terminal 1 is located within a predetermined distance range from the vehicle 2, that the linear distance between the vehicle 2 and the terminal 1 is less than a predetermined distance, or that the vehicle 2 is present ahead of the moving direction of the terminal 1. Incidentally, the predetermined distance is a distance indicating that the terminal 1 approaches the vehicle 2. Such a distance is experimentally determined. As described above, there are a plurality of methods for detecting the user approaching the vehicle 2, and the detection unit 151 detects the user approaching the vehicle 2 by using at least one of the methods described above.

The method of detecting the user being away from the vehicle 2 is, for example, a method of using locking information of the door of the vehicle 2, or a method of using reservation information of the vehicle 2 and position information of the vehicle 2. An example of a method of detecting the user being away will be described. For example, the detection unit 151 detects the user being away from the vehicle 2 based on the locking information of the door of the vehicle 2. In the car sharing system described above, when the use of the vehicle 2 by the user is completed, it is common for the user to place the key of the vehicle 2 in a predetermined place in the dashboard, then hold the member card used at the time of unlocking to the authentication apparatus to lock the door of the vehicle 2. At this time, the detection unit 151 acquires the lock information of the door indicating that the door has been locked from the vehicle 2, thereby being able to detect the user being away from the vehicle 2 (i.e., the state in which the user is away from the vehicle 2 or the state in which the user is scheduled to be away therefrom).

Another example of the method of detecting the user being away from the vehicle 2 will be described. The detection unit 151 may detect the user being away from the vehicle 2 based on the positional information of the vehicle 2 and the reservation information of the vehicle 2. For example, the detection unit 151 identifies that the vehicle 2 has arrived at the return station, i.e., the station to which the user returns the vehicle 2, within the remaining several minutes or several tens of minutes until the plan end of use based on the position information of the vehicle 2 and the reservation information of the vehicle 2. In this case, the detection unit 151 may detect the user being away from the vehicle 2 by determining that the user intends to be away from the vehicle 2. Incidentally, the determination that the vehicle 2 has arrived at the return station is not limited to that the position of the vehicle 2 and the position of the return station are completely matched. That is, even when the vehicle 2 travels or stops within a predetermined range from the return station, it may be determined that the vehicle 2 has arrived at the return station. Further, the time for determining the arrival of the return station may be in the vicinity of the plan end-of-use time, or may be after the scheduled end-of-use time. As described above, there are a plurality of methods for detecting the user being away from the vehicle 2, and the detection unit 151 detects the user being away from the vehicle 2 by using at least one of the methods described above.

Further, the detection unit 151 can detect the user approaching or being away from the vehicle 2 (hereinafter, also referred to as the reserved vehicle 2') reserved by the user based on the reservation information of the vehicle 2. The reservation information of the vehicle 2 is acquired by the reservation information acquirement unit 152, which will be described later.

For example, when receiving the door unlocking information from the vehicle 2, the detection unit 151 refers to the reservation information of the plurality of vehicles 2 acquired by the reservation information acquirement unit 152, and can determine whether or not the vehicle 2 that transmitted the door unlocking information is the reserved vehicle 2'. The determination method is, for example, a method of comparing the identification information of the vehicle 2 with the identification information of the vehicle 2 included in the reservation information of the vehicle 2. For example, when the reservation information of the vehicle 2 coincides with the identification information of the vehicle 2 to which the unlocking information of the doors has been transmitted among the reservation information of the plurality of vehicles 2, the detection unit 151 specifies the vehicle 2 (the approaching vehicle) approached by the user as the reservation vehicle 2'. Here, the method of specifying the reserved vehicles 2' is not particularly limited.

Next, the function of the reservation information acquirement unit 152 will be described. The reservation information acquirement unit 152 acquires the reservations of the plurality of vehicles 2 from the servers 3. The reservation information of the vehicle 2 is used in the above-described detection unit 151 to determine whether or not the vehicle approached by the user is the vehicle 2 reserved by the user.

Next, the function of the inspection information acquirement unit 153 will be described. The inspection information acquirement unit 153 acquires the inspection item list of the reserved vehicle 2' from the server 3. The inspection item list for the reserved vehicle 2 includes inspection procedure and confirmation contents associated with each inspection item. The inspection information acquirement unit 153 transmits a request signal for acquiring the inspection item list to the server 3 due to the detection unit 151 detecting the user approaching to the reserved vehicle 2' or the user being away from the reserved vehicle 2'. This allows the inspection information acquirement unit 153 to acquire the inspection item list for reserved vehicle 2' that the user approaches or is away from.

In the present embodiment, the inspection information acquirement unit 153 transmits a request signal for acquiring the inspection item list to the servers 3 due to that the inspection request accepting unit 155, which will be described later, accepts the inspection request of the reserved vehicle 2' from the vehicle 2 or the user. This allows the inspection information acquirement unit 153 to acquire the inspection item list for the reserved vehicle 2' for which inspection is required. Here, the above mentioned timing at which the inspection information acquirement unit 153 acquires the inspection item list of the reserved vehicle 2' is an example, and other examples will be described later.

The inspection information acquirement unit 153 acquires vehicle information indicating the present status of the reserved vehicle 2' from the reserved vehicle 2'. The vehicle information may include, for example, tire pressure, tire temperature, engine coolant temperature, engine oil temperature, or water level of window washer fluid, brake fluid, engine coolant, or engine oil water level. The inspection information acquirement unit 153 transmits a request signal for acquiring the vehicle information to the reserved vehicle 2 due to receiving the inspection item list from the server 3. For example, when the inspection item list received from the server 3 includes the inspection item "tire pressure", the inspection information acquirement unit 153 transmits a request signal for acquiring vehicle information to the reserved vehicle 2'.

Next, the functions of the captured image acquirement unit 154 will be described. The captured image acquirement unit 154 acquires captured image from the imaging apparatus 14. The captured image acquirement unit 154 performs an imaging process on the acquired captured image to determine whether captured image includes all or a portion of the reserved vehicle 2'. This allows the captured image acquirement unit 154 to acquire a captured image containing at least a portion of the reserved vehicle 2'. In the present embodiment, although captured image is described as a moving image, captured image may be a still image.

Next, the function of the inspection request accepting unit 155 will be described. The inspection request accepting unit 155 accepts the inspection request of the reserved vehicle 2' from the user or the reserved vehicle 2'. A situation in which inspection is requested to the reserved vehicle 2' is, for example, a situation in which the user feels that some abnormality has occurred in the reserved vehicle 2' when the user is driving the reserved vehicle 2'. In such a situation, the user stops the reserved vehicle 2' in a place where the vehicle can be stopped according to the traffic law, and operates the terminal 1 to inspect the reserved vehicle 2'. The inspection request accepting unit 155 accepts a inspection request signal of the reserved vehicle 2' from the input apparatus 11 when the user executes an operation to the terminal 1 for requesting inspection of the reserved vehicle 2. Further, another situation is a situation in which, for example, when the user is driving the reservation vehicle 2', an abnormal state of the reservation vehicle 2' is detected in the reservation vehicle 2' by the self-diagnosis function of ECU 22. In such cases, a signal of inspection request of the vehicle 2 are inputted from the reserved vehicle 2' to the inspection request accepting unit 155 via the communication apparatus 13. When DTC is displayed by the self-diagnosis function of ECU 22, it is assumed that the user stops the reserved vehicle 2' at a place where the vehicle 2'can be stopped in accordance with traffic regulations.

Next, the function of the information provision unit 156 will be described. The information provision unit 156 performs the process to provide the information to the user, the information related to the reserved vehicle 2' which the user has approached or been away from, based on that the detection unit 151 detects the user approaching to the reserved vehicle 2' or the user being away from the reserved vehicle 2'. The information provision unit 156 also performs a process to provide the inspection information to an user, the inspection information being related to the reserved vehicle 2 requested to be inspected, based on that the inspection request accepting unit 155 accepts the inspection request on the reserved vehicle 2'. The inspection information on the reserved vehicle 2' includes at least inspection item list (an inspection item, an inspection procedure, a confirmation content, etc.) of the reserved vehicle 2'. When vehicle information corresponding to inspection item exists in the vehicle information of the reserved vehicle 2', inspection information related to the reserved vehicle 2' includes the vehicle information.

The information provision unit 156 controls the inspection information acquirement unit 153 to acquire the inspection item list of the reservation vehicle 2' when the detection unit 151 detects the user approaching the reservation vehicle 2' or the user being away from the reservation vehicle 2'. The information provision unit 156 outputs the inspection item list of the reserved vehicle 2' acquired by the inspection information acquirement unit 153 to the output apparatus 12. Thus, the inspection item list is provided to the user who approaches the reserved vehicle 2'. Examples of provision results by the information provision unit 156 will be described later. Here, the process when the inspection request accepting unit 155 receives inspection request is the same as the process when the detection unit 151 detects the user approaching to the reserved vehicle 2' or the user being away from the reserved vehicle 2', so the above-described explanation is used.

The method of providing the inspection item list by the information provision unit 156 is not particularly limited. The information provision unit 156 may control the output apparatus 12 to provide all or a portion of the inspection item list to the user. For example, when the information provision unit 156 provides all of the inspection item lists to the user, the user can select inspection item desired by the user from all of inspection items. By repeatedly selecting inspection item, the user can perform the inspection tasks in the order desired by the user. Also, for example, when inspection item is provided to the user on an item-by-item basis by the information provision unit 156, the user may perform the inspection operations in a recommended order.

The information provision unit 156 can also control the outputting apparatus 12 to change the order of the inspection numbers and provide the inspection numbers to the user in descending order from the highest-priority inspection item based on the reservation information of the vehicle 2 or the external environmental information. The external environment information is, for example, a position of the terminal, date, time, weather, temperature, or humidity. The information provision unit 156 acquires external environmental information from servers existing on the network 4. For example, when it is cold and snowy, the information provision unit 156 may prioritize inspection item on tires, inspection item on engine oil, or inspection item on batteries. As a result, the user can perform the inspection operation from the item that needs to be inspected earlier.

Next, the inspection result recording unit 157 will be described. When the user completes all the inspection operations, inspection result recording unit 157 outputs the inspection result to the communication apparatus 13. As a result, the inspection result is transmitted from the communication apparatus 13 to the server 3. The inspection result includes at least a result confirmed by the user for each inspection item. Depending on the type of inspection item, the inspection result includes not only the confirmation result by the user but also the vehicle information provided to the user by the information provision unit 156.

Figure 2:
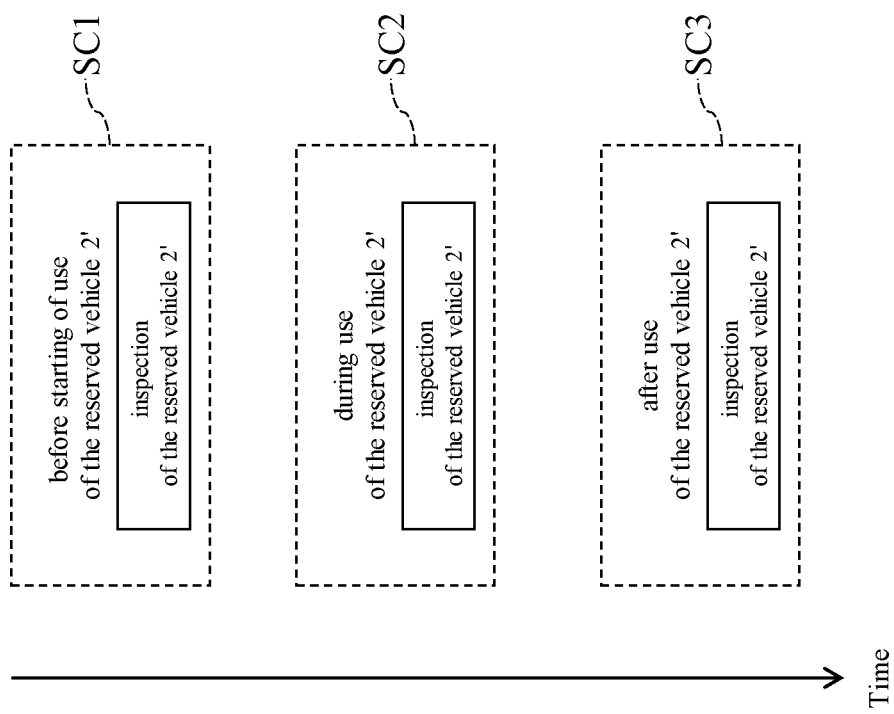
FIG. 2 is a diagram showing an exemplary scene where the inspection of the vehicle is performed.

Next, an example of a situation in which an inspection of the vehicle 2 is performed by the user in the car sharing system will be described with reference to FIG. 2. Further, FIGS. 3A and 3B describes examples of time charts for the terminal 1 to receive the inspection item lists in the respective situations shown in FIG. 2. FIG. 2 is a diagram showing an example of a situation where the inspection of the vehicle 2 is performed. FIG. 2 illustrates an example of a situation in which a user using the car sharing system inspects the reserved vehicle 2'.

As shown in FIG. 2, a situation in which the user inspects the reserved vehicle 2 is, for example, prior to the start of use of the reserved vehicle 2' (SC1), during use of the reserved vehicle 2' (SC2), or after the end of use of the reserved vehicle 2' (SC3). In each situation, the information processing apparatus 15 according to the present embodiment performs a process to provide an inspection information regarding the inspection of the reserved vehicle 2' to the user. In the following descriptions, each situation will be described, and even in all situation, the user does not necessarily have to inspect the reserved vehicle 2', and the user inspects the reserved vehicle 2' as appropriate.

Figure 3A:
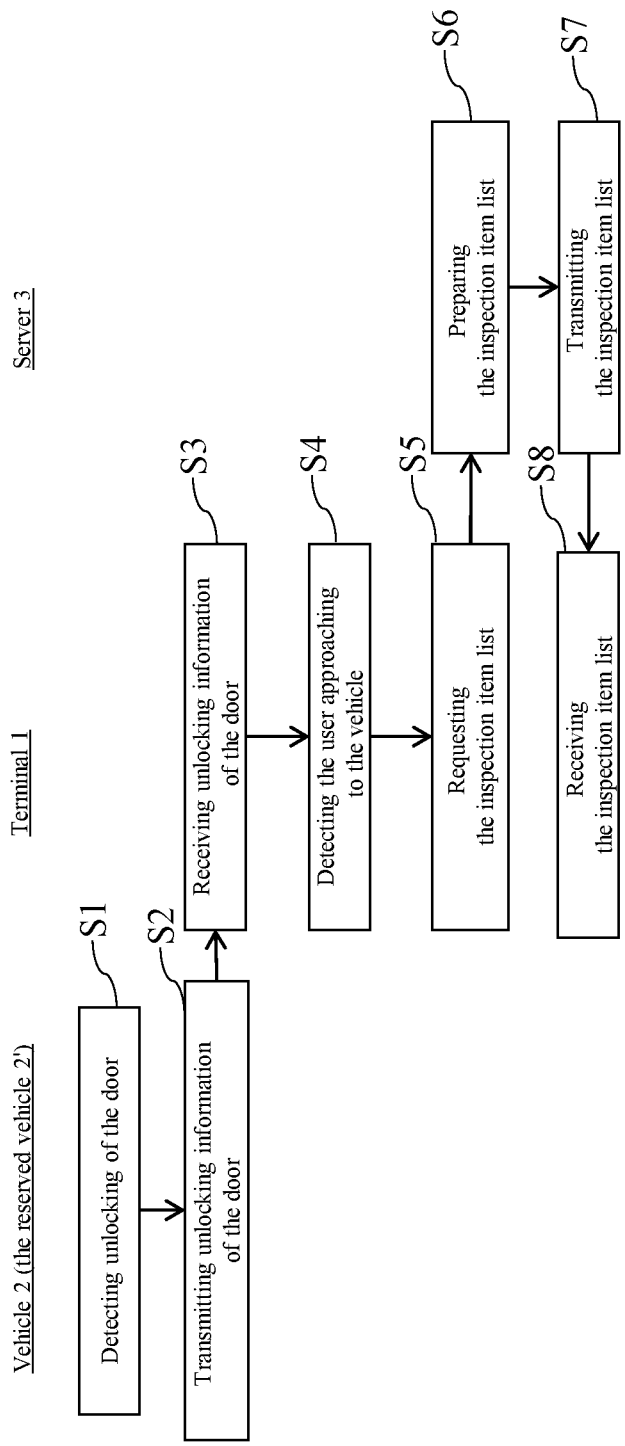
FIG. 3A is an exemplary time chart for receiving the inspection item lists in the "pre-ride inspection" shown in FIG. 2.
Figure 3B:
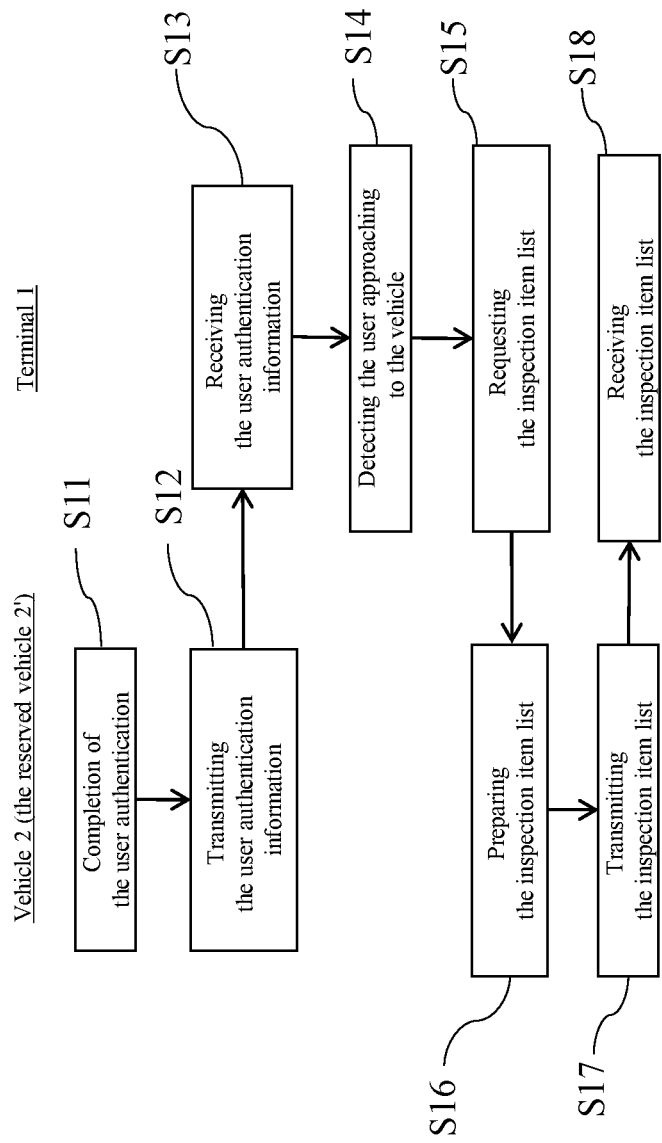
FIG. 3B is an exemplary time chart for receiving the inspection item lists in the "pre-ride inspection" shown in FIG. 2.

FIG. 3A and FIG. 3B are examples of the time charts for the terminal 1 to receive the inspection item list in the situation SC1 shown in FIG. 2. FIG. 3A is an example of receiving the inspection item list from the server 3, and FIG. 3B is an example of receiving the inspection item list from the reserved vehicle 2'. FIG. 3A shows an example of transmitting and receiving information between the vehicle 2 (reserved vehicle 2') and the terminal 1, and between the server 3 and the terminal 1. FIG. 3B shows an example of transmitting and receiving information between the vehicle 2 (reserved vehicle 2') and the terminal 1.

As illustrated in FIG. 3A, when the user unlocks the door of the reserved vehicle 2', it is detected that the door of the reserved vehicle 2' has been unlocked by ECU22 (Step 51). Then, the unlocking information of the door indicating that the door is unlocked is transmitted from the reserved vehicle 2' to the terminal 1 (step S2). The terminal 1 receives the unlocking information of the door via the communication apparatus 13 (step S3). When the door unlocking information is input to the information processing apparatus 15 of the terminal 1, the information processing apparatus 15 detects the user approaching the reserved vehicle 2' (the state in which the user is approaching the reserved vehicle 2') (Step S4).

In step S5, the information processing apparatus 15 performs a process to transmit the request signal for acquiring the inspection item list corresponding to the reserved vehicle 2' to the server 3. When the server 3 receives the request signal, the inspection item list, the server identifies the inspection list of the reserved vehicle 2 referring to the database(step S6). Then, the server 3 transmits the inspection item list of the reserved vehicle 2' to the terminal 1 (step S7). The terminal 1 receives the inspection item list of the reserved vehicle 2' by the communication apparatus 13 (step S8).

Further, as FIG. 3B illustrates, when the user performs the user authentication procedure prior to starting the use of the reserved vehicle 2', in the reserved vehicle 2', the user authentication process is completed (Step S11), and the user authentication information indicating that the user authentication is completed is transmitted from the reserved vehicle 2' to the terminal 1 (Step S12). The terminal 1 receives the user authentication information through the communication apparatus 13 (Step S13). When the user authentication information is input to the information processing apparatus 15 of the terminal 1, the information processing apparatus 15 detects the state of the user approaching the reserved vehicle 2' by assuming that the user is approaching the reserved vehicle 2' (Step S14).

The information processing apparatus 15 executes the process of transmitting the inspection request for acquiring the inspection item list corresponding to the reserved vehicle 2' to the reserved vehicle 2'. ECU 22 executes the process of acquiring the inspection item list of the reserved vehicle 2' (Step S16). For example, when the request signal of the inspection item is input to ECU 22, ECU 22 acquires the inspection item list from a storage apparatus such as ROM that stores the inspection item list of the reserved vehicle 2. Then, ECU22 executes the process of transmitting the inspection item list of the reserved vehicle 2' to the terminal 1 (step S17). The terminal 1 receives the inspection item list of the reserved vehicle 2' via the communication apparatus 13 (step S18).

Figure 4A:
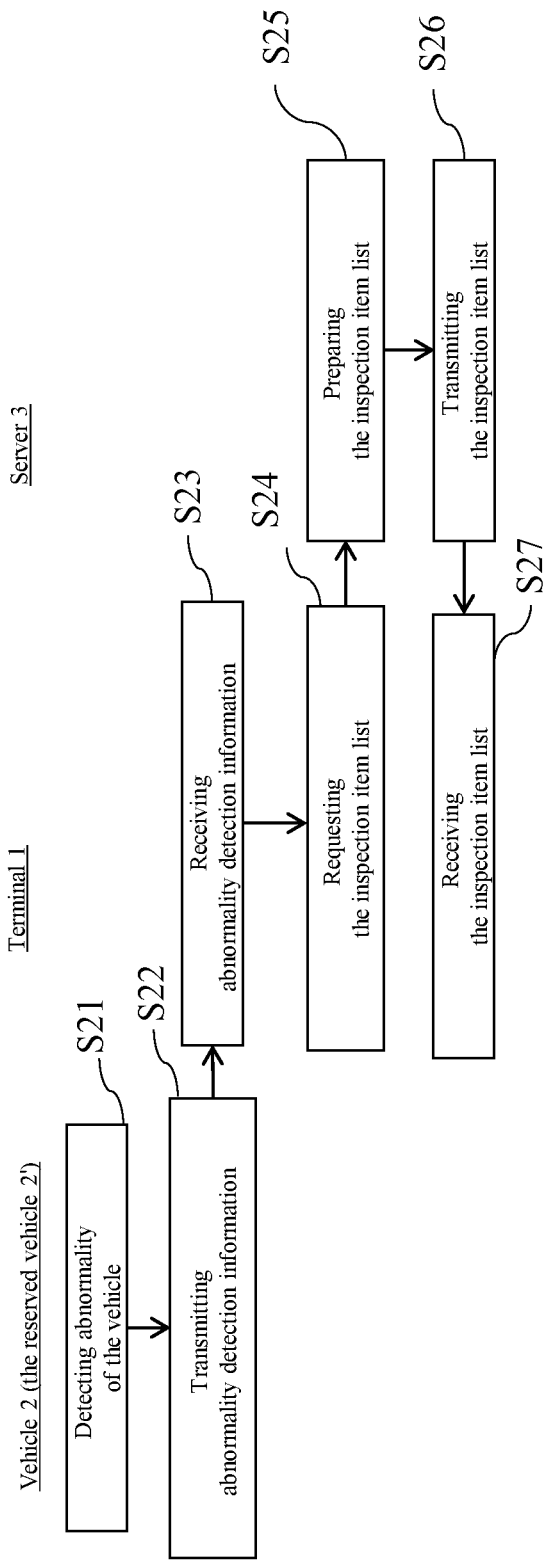
FIG. 4A is an exemplary time chart for receiving the inspection item lists in the "inspection while riding" shown in FIG. 2.
Figure 4B:
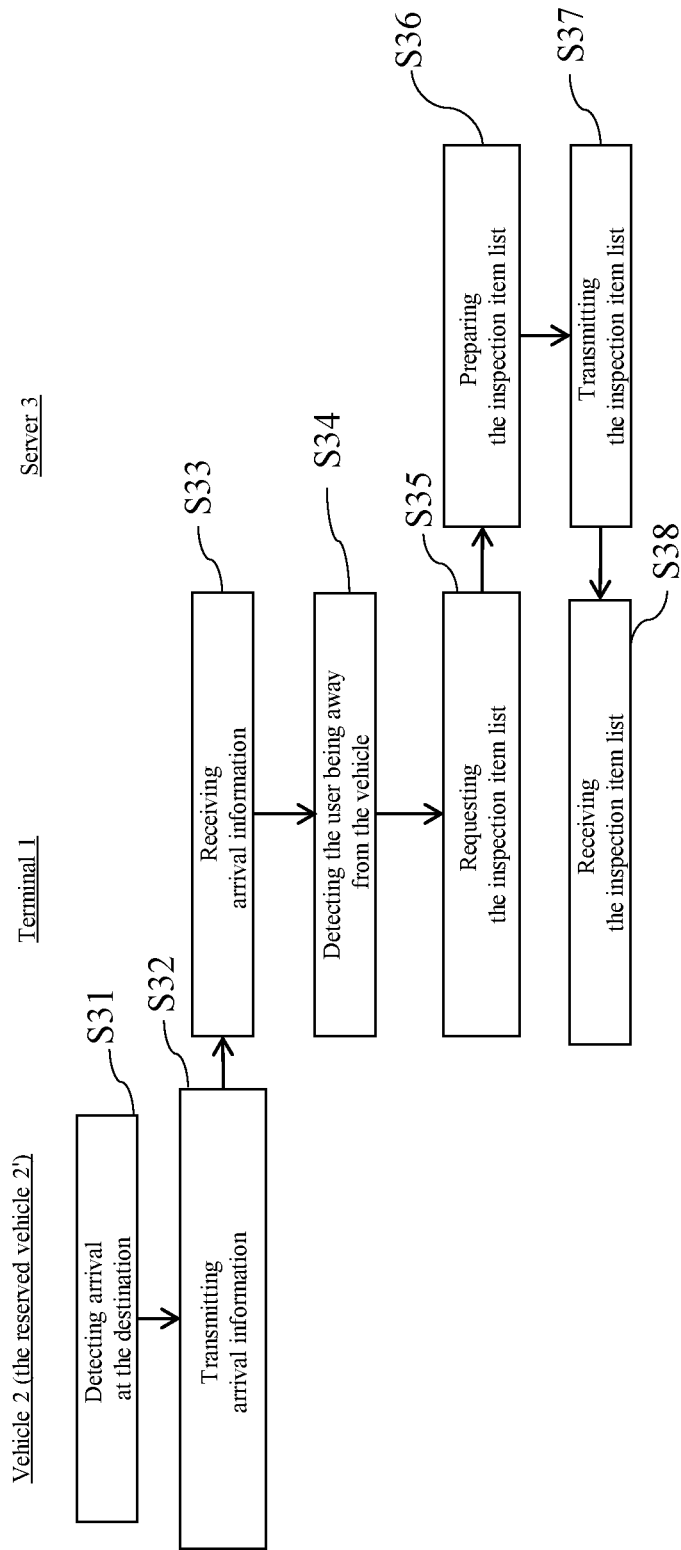
FIG. 4B is an exemplary time chart for receiving the inspection item lists in the "inspection after riding" shown in FIG. 2.

FIG. 4A is an exemplary time chart for the terminal 1 to receive the inspection item list in the situation SC2 shown in FIG. 2. FIG. 4B is an example of the time chart for the terminal 1 to receive the inspection item list in the situation SC3 shown in FIG. 2. FIG. 4A and 4B show an example of transmitting and receiving information between the vehicle 2 (reserved vehicle 2') and the terminal 1 and between the server 3 and the terminal 1.

As FIG. 4A illustrates, when some abnormality occurs in the reserved vehicle 2' in a situation where the user is using the reserved vehicle 2', ECU 22 detects the abnormality of the reserved vehicle 2 (step S21). Then, the abnormality detection information indicating that the abnormality has occurred is transmitted from the reserved vehicle 2' to the terminal 1 (step S22). Terminal 1 receives the abnormality detection information of the reserved vehicle 2' via the communication apparatus 13 (step S23). When the abnormality detection information is input to the information processing apparatus 15 of the terminal 1, the information processing apparatus 15 determines that the reserved vehicle 2' needs to be inspected, and executes a process to transmit a request signal for acquiring the inspection item list corresponding to the reserved vehicle 2' to the server 3 (S24). Since the subsequent steps S25 to S27 correspond to the steps S6 to S8 shown in FIG. 3A, the above-described descriptions will be referred to the respective steps. Incidentally, as illustrated in FIG. 4A, when some abnormality occurs in the reserved vehicle 2' in a situation in which the reserved vehicle 2' is used, the user stops the reserved vehicle 2' at a stoppable place according to the traffic law. Then, the user inspects the reserved car 2' while the car is stopped.

Further, as FIG. 4B illustrates, ECU 22 detects arrival at the destination when the reserved vehicle 2' arrives at the user's destination (e.g., a return station) (step S31). The reservation vehicle 2' transmits the arrival information to the terminal 1, the arrival information indicating that the reservation vehicle 2' has arrived at the user's destination (step S32). The terminal 1 receives the arrival information through the communication apparatus 13 (step S33). When the arrival information is input to the information processing apparatus 15 of the terminal 1, the information processing apparatus 15 detects the user being away from the reserved vehicle 2' on the assumption that the user is to be away from the reserved vehicle 2' (step S34). The information processing apparatus 15 performs a process to transmit the request signal for acquiring the inspection item list corresponding to the reserved vehicle 2' (step S35). Since the subsequent steps S36 to S38 correspond to the steps S6 to S8 shown in FIG. 3A, the above-described descriptions will be referred to for the respective steps.

Figure 5A:
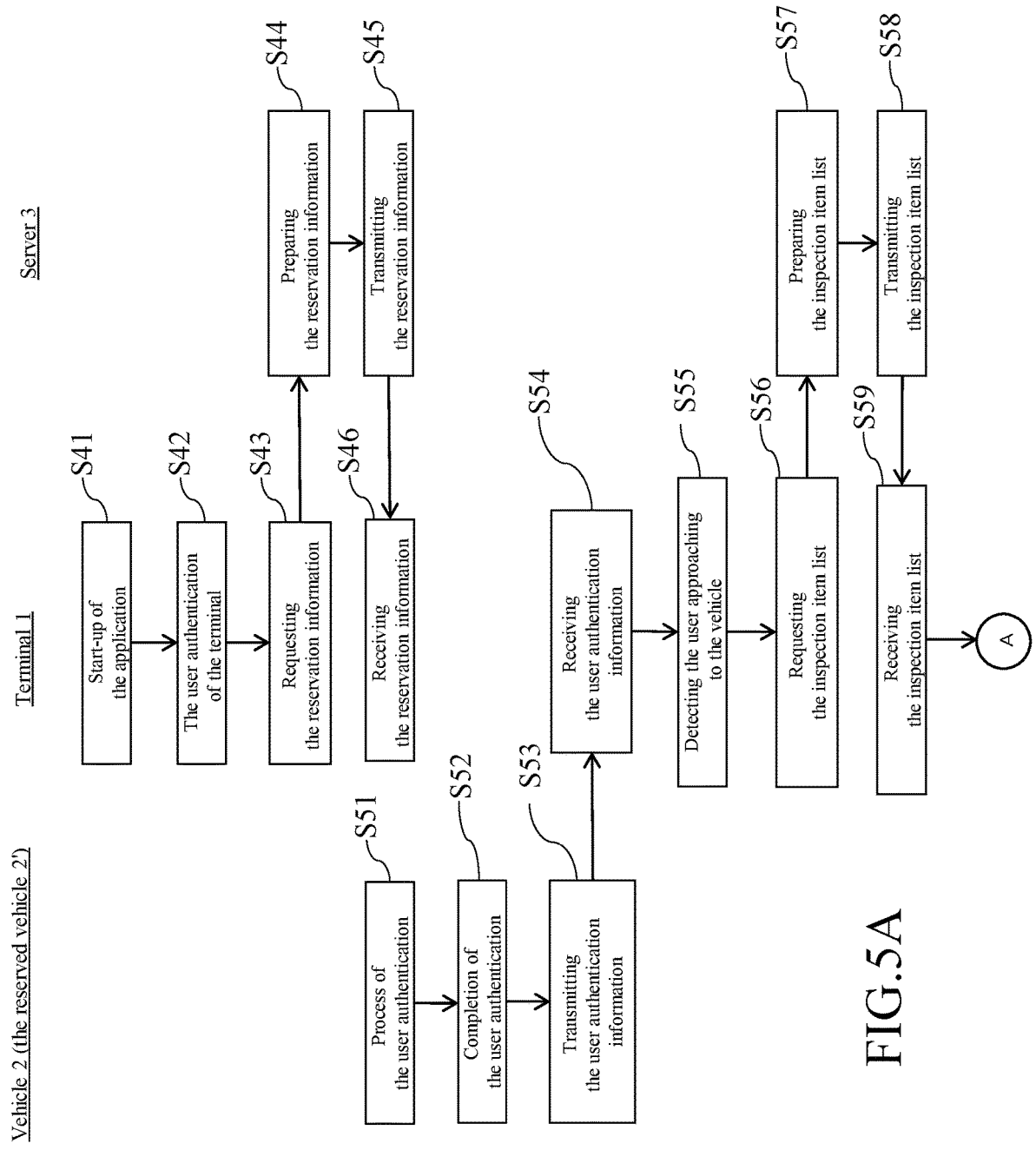
FIG. 5A is an exemplary time chart when inspection system of a vehicle according to this embodiment is applied to a car sharing system.
Figure 5B:
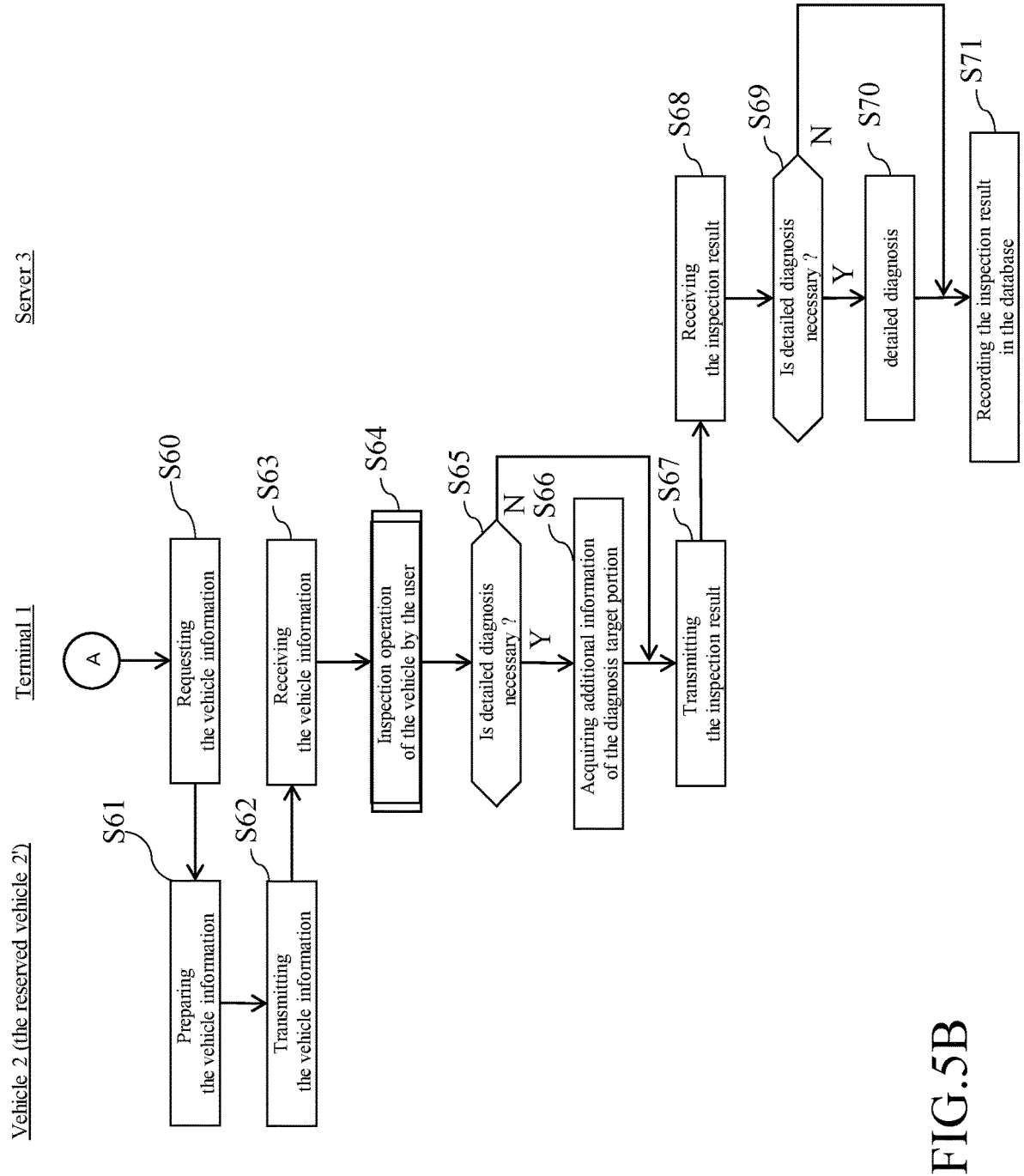
FIG. 5B is an exemplary time chart when inspection system of a vehicle according to this embodiment is applied to a car sharing system.

Next, a series of flows will be described in the car sharing system from the time when the inspection of the vehicle 2 is started to the time when the inspection of the vehicle 2 is completed, by using FIG. 5A and FIG. 5B. FIG. 5A and FIG. 5B show an example of a time chart when the inspection system 100 of the vehicle according to the present embodiment is applied to a car sharing system. FIG. 5A and 5B show an example of transmitting and receiving information between the vehicle 2 (reserved vehicle 2') and the terminal 1 and between the server 3 and the terminal 1.

For example, when an application used in the car sharing system is installed in the terminal 1, the user makes a reservation of the vehicle 2 from the dedicated application. For example, on the day before the day on which the vehicle 2 is used, the user starts the application in order to check a use time, a standby place of the vehicle 2, or the like (step S41). When the application starts, the terminal 1 executes the user authentication process (Step S42). This authentication process is a process for confirming that the user operating the terminal 1 is a registered member of the car sharing system. For example, when the user enters the user's member ID and passwords on the login screen displayed in the application, the terminal 1 executes the user authentication process.

The information processing apparatus 15 of the terminal 1 performs a process to transmit the request signal for acquiring the reservation information of the vehicle 2 to the server 3 (step S43). The server receives the request signal for the reservation information of the vehicle 2 and identifies the reservation information of the vehicle 2 in reference to the database 31 (step S44). The server 3 transmits the reservation information of the vehicle 2 to the terminal 1 (step S45). For example, Terminal 1 receives the reservation information of the reserved vehicle 2' via the communication apparatus 13 (step S46).

Although the day before the day on which the vehicle 2 is used is taken as an example in the description of step S41, the reception of the reservation information by the terminal 1 may be performed before the user uses the vehicle 2. That is, the date on which the reservation information is received by the terminal 1 is not limited to the day before the use date. For example, the day on which the reservation information is received by the terminal 1 may be the day on which the vehicle 2 is used.

On the day of using the vehicle 2, the user goes to the standby station of the reservation vehicle 2' to be used and performs the user authentication procedure. For example, when the user holds the card dedicated to the member over the user authentication apparatus mounted on the reservation vehicle 2', the user authentication process is executed on the reservation vehicle 2' (Step S51). Steps S52 to S55 correspond to steps S11 to S14 shown in FIG. 3B, and steps S56 to S59 correspond to steps S5 to S8 shown in the FIG. 3A, so that the above-described descriptions are incorporated for the respective steps.

When the terminal 1 receives the inspection item lists of the reserved vehicles 2', the process proceeds to step S60. As illustrated in FIG. 5B, the information processing apparatus 15 transmits a request signal for acquiring the vehicle information of the reserved vehicle 2' through the communication apparatus 13 to the reserved vehicle 2' in order to provide the present status information of the reserved vehicle 2' to the user (Step S60).

ECU 22 executes a process of acquiring the vehicle information of the reserved vehicle 2' (step S61). For example, when the request signal of vehicle information is entered in ECU 22, ECU 22 acquires the vehicle information detected by the in-vehicle sensors 21. Thus, ECU22 can acquire the vehicle data indicating the present state of the reserved vehicle 2'. ECU 22 transmits the vehicle data of the reserved vehicle 2' to the terminal 1 through the in-vehicle communicating apparatus 23 (Step S62). Terminal 1 receives the vehicle information of the reserved vehicle 2' via the communication apparatus 13 (step S63).

When the terminal 1 receives the vehicle data of the reserved vehicle 2', the process proceeds to step S64. Step S64 is an inspection operation of the reserved vehicle 2' performed by the user using the terminal 1. The process performed by the information processing apparatus 15 of the terminal 1 in the inspection operation of the reserved vehicle 2' will be described later.

When the inspection operation of the reserved vehicle 2' by the user is completed, the process proceeds to step S65. The information processing apparatus 15 of the terminal 1 refers to the inspection result and determines whether or not a more detailed diagnosis is required. For example, when at least one item of the plurality of inspection item includes an item determined to be NG in the user's inspection, the information processing apparatus 15 determines that a detailed inspection is required for the corresponding inspection item. When it is determined that the detailed diagnosis is necessary, the process proceeds to step S66, and when it is determined that the detailed diagnosis is unnecessary, the process proceeds to step S67.

When it is determined in step S65 that the detailed diagnosis is necessary, the process proceeds to step S66. In S66, the information processing apparatus 15 executes a process so as to additionally acquire the information of the diagnostic target portion. For example, in the inspection item where the result of inspecting by the user is "NG", or in the event that the vehicle information indicating the abnormal values is "tire air pressure", the information processing apparatus 15 transmits a request signal for acquiring the information of the replacement times of the respective tires to the reserved vehicle 2' via the communication apparatus 13. The information processing apparatus 15 receives, via the communication apparatus 13, detailed information of the tires acquired by ECU22. Information requested to the reserved vehicle 2' is not particularly limited, and the information may be different for each inspection item and each component to be inspected, for example.

The information processing apparatus 15 also controls the outputting apparatus 12 to request the user to take a captured image of the tire. For example, the information processing apparatus 15 causes the output apparatus 12 to output a message requesting the user to photograph an entire image of each tire, or a message requesting the user to photograph a particular portion of each tire. The information requested to the user is not particularly limited, and may be different for each inspection item and each component to be inspected, for example.

Figure 6:
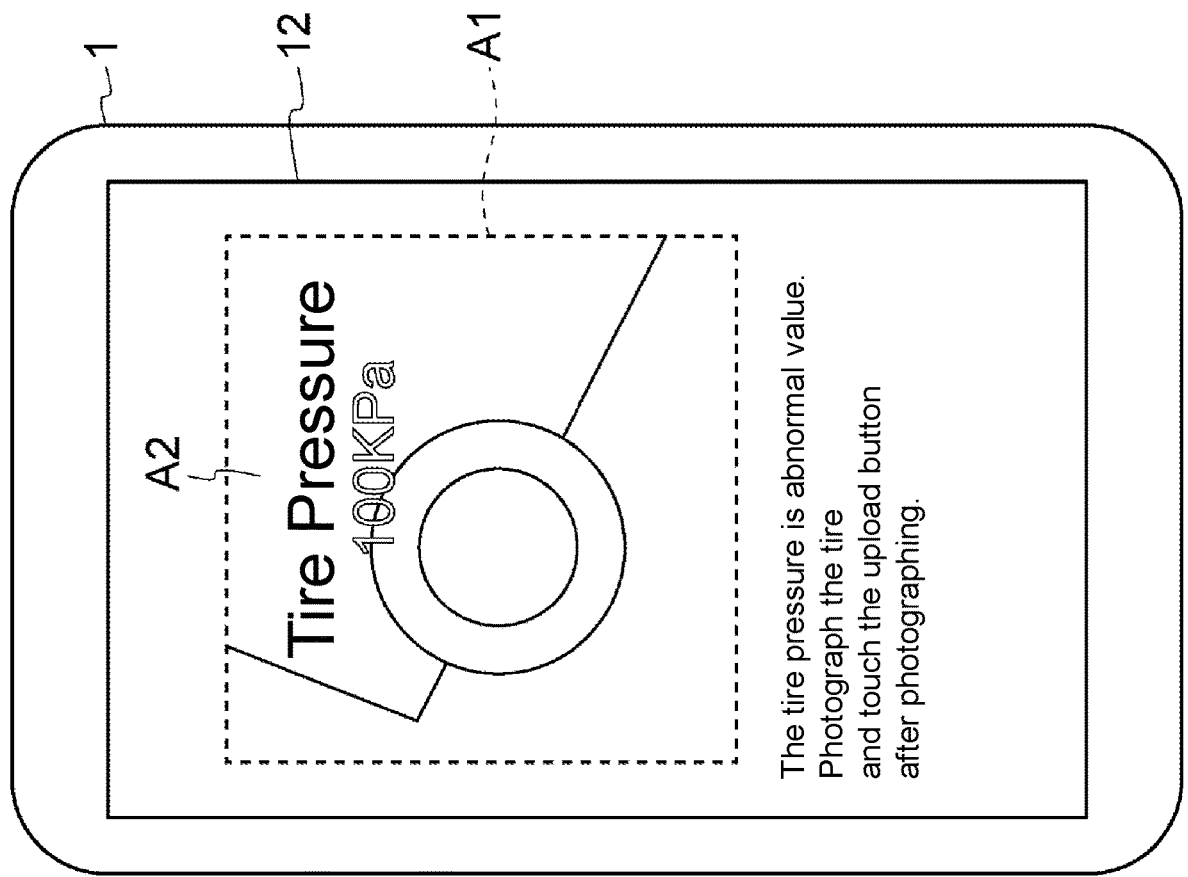
FIG. 6 is an exemplary screen displayed on the terminal by information processing apparatus according to the present embodiment.

FIG. 6 shows an example of a screen displayed on the terminal 1 by the information processing apparatus 15. As shown in FIG. 6, the information processing apparatus 15 causes the display (corresponding to the output apparatus 12) of the terminal 1 to display a screen including the captured image of the tires of the reserved vehicle 2 photographed by the user (the portion to be displayed at A1) superimposed by the vehicle information which the in-vehicle sensors 21 has acquired. Further, the information processing apparatus 15 causes the display of the terminal 1 to display a message requesting the user to photograph the tires.

Referring back to FIG. 5B, the time chart will be described. In step S67, the information processing apparatus 15 transmits the inspection result to the server 3 via the communication apparatus 13. Thus, the inspection result is transmitted from the terminal 1 to the server 3. When the process proceeds to step S67 through step S66, the inspection result includes the additional information of the diagnosis target portion acquired in step S66.

When the inspection result is transmitted from the terminal 1, the server 3 receives the inspection result (step S68). The server processing apparatus 32 determines whether a detailed diagnostic is required (step S69). For example, the server processing apparatus 32 refers to the inspection result, and when the inspection result includes the other inspection result in addition to confirmation information corresponding to the inspection item and vehicle information corresponding to the inspection item, it is determined that the detailed diagnosis is required. When it is determined that the detailed diagnosis is necessary, the process proceeds to step S70, and when it is determined that the detailed diagnosis is unnecessary, the process proceeds to step S71.

The above mentioned method of determining whether or not the detailed diagnosis is necessary is only an example, and for example, the server processing apparatus 32 of the server 3 may independently determine whether or not the detailed diagnosis is necessary even when the inspection result does not include additional information. For example, the server processing apparatus 32 may refer to the inspection result and determine whether or not the detailed diagnostic is required based on whether or not value (the vehicle information) acquired by the in-vehicle sensors 21 is within a predetermined range. Further, for example, the server processing apparatus 32 may determine whether or not a detailed diagnostic is required by referring to the inspection result and analyzing the captured image captured by the user.

When it is determined that a detailed diagnosis is necessary in step S69, the process proceeds to step S70. In step S70, the server processing apparatus 32 performs detailed diagnoses. In the present embodiment, the detailed diagnosis is not particularly limited, and the detailed diagnosis may be, for example, image analysis of the captured image or numerical analysis of the vehicle information.

In step S71, the inspection results are recorded in the database 31 by the server processing apparatus 32. When the process proceeds to step S71 through step S70, the inspection result includes the information of the diagnosis result diagnosed in step S70.

Figure 7:
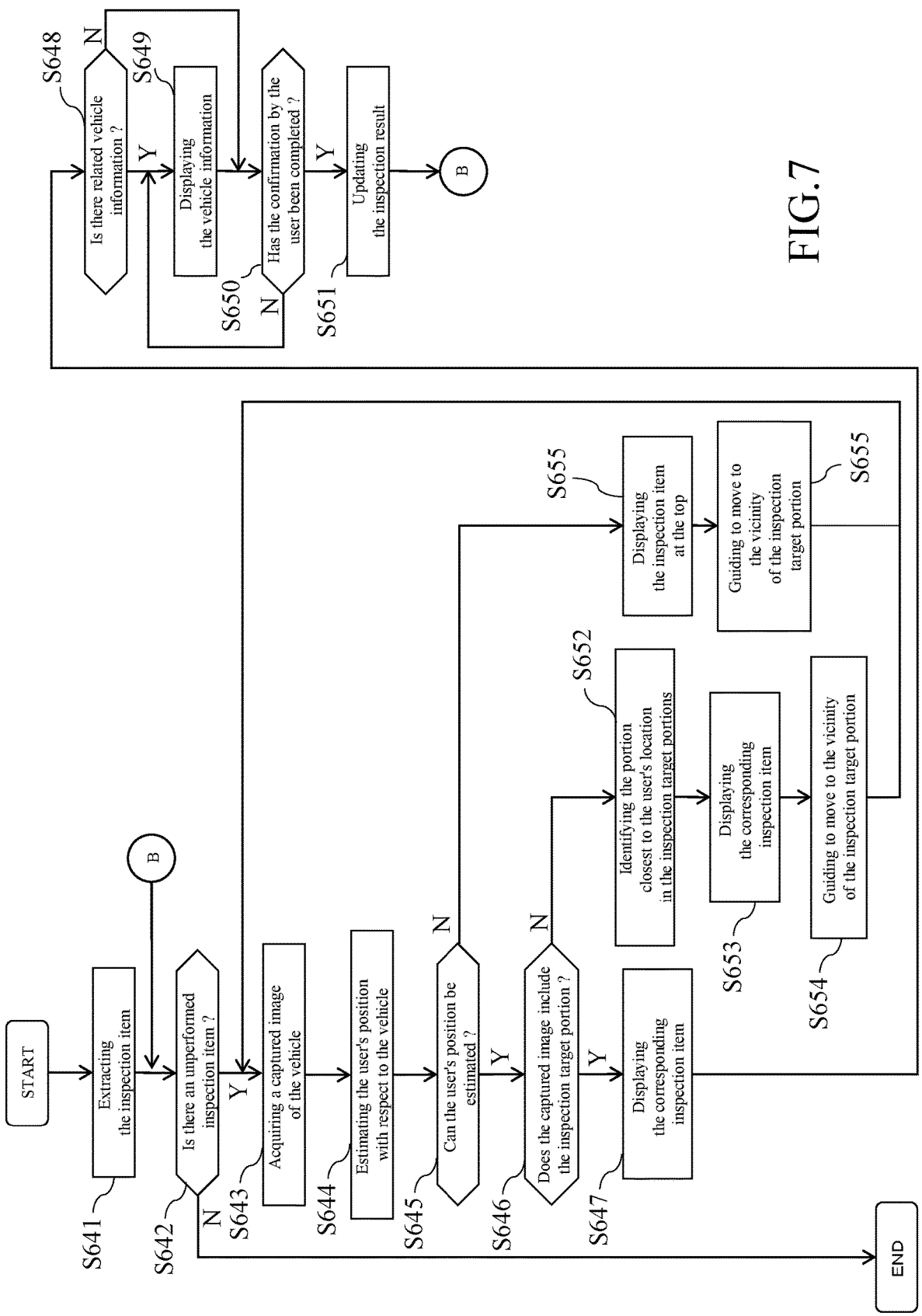
FIG. 7 is a flow chart showing a process executed by information processing apparatus according to the present embodiment in the operation of inspecting the reserved vehicles by the user.
Figure 8A:
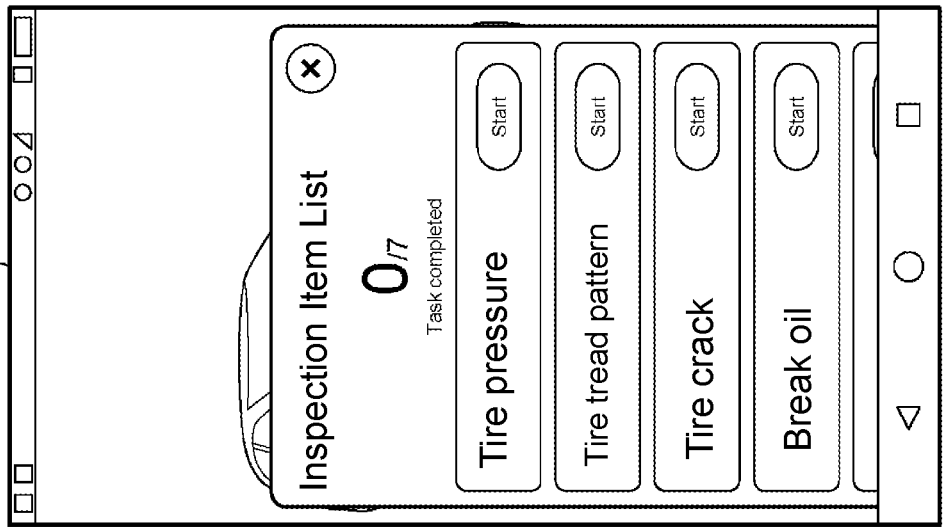
FIG. 8A is an exemplary screen displayed on the terminal by information processing apparatus in the steps shown in FIG. 7.

Next, processes performed by the information processing apparatus 15 in the inspection operation of the reserved vehicle 2' by the user will be described with reference to FIGS. 7 to 9. FIG. 7 is a flowchart illustrating processes performed by the information processing apparatus 15 in the inspection operation of the reserved vehicle 2' by the user. The flow chart shown in FIG. 7 corresponds to the subroutine of the "inspection operation of the vehicle by the user" (step S64) shown in the drawing 5B. FIGS. 8A to 8D are examples of screens displayed on the terminal 1 by the information processing apparatus 15 in the steps shown in FIG. 7. FIG. 9A and FIG. 9B are other examples of screens displayed on the terminal 1 by the information processing apparatus 15 in the steps shown in FIG. 7. In the following description, the output apparatus 12 of the terminal 1 will be described as a display.

As illustrated in FIG. 7, in the step S641, the information processing apparatus 15 extracts the inspection item of the reserved vehicle 2' from the inspection item list of the reserved vehicle 2' when the inspection operation of the reserved vehicle 2' is started by the user. The process in this step aims at optimizing the inspection item list.

For example, the information processing apparatus 15 acquires, via the communication apparatus 13, weather information of the area including the standby station of the reserved vehicle 2' or the area including the user's destination. When the maximum temperature of the area is equal to or higher than the predetermined temperature, the information processing apparatus 15 extracts the inspection items on water levels of coolant of the engine and engine oil from the inspection item list of the reserved vehicles 2'. On the other hand, when the maximum temperature of the area is less than the predetermined temperature, the information processing apparatus 15 determines whether or not to extract the inspection items relating to water levels of coolant of the engine and engine oil according to time elapsed since the previous inspection operation or travel distance of the reserved vehicle 2'. Here, the previous inspection operation described above is the inspection operation with respect to water levels of coolant of the engine and engine oil. For example, when only a few days have elapsed since the date of the previous inspection operation, the information processing apparatus 15 does not extract the inspection items relating to water levels of coolant of the engine and engine oil. Further, for example, when the travel distance of the reserved vehicle 2' is less than the predetermined distance, the information processing apparatus 15 does not extract the inspection items relating to water levels of coolant of the engine and engine oil.

For example, when the weather or weather forecast of the area including the user's destination is "snow", the information processing apparatus 15 extracts the inspection item relating to chain mounting of the tires from the inspection item list of the reserved vehicles 2'. Further, when the weather or weather forecast of the area is "fine", the information processing apparatus 15 determines whether or not to extract the inspection item relating to chain mounting of the tires according to the destination of the user. For example, when the information processing apparatus 15 determines that the user's destination is a snow mountain or a ski ground from the user's destination position data, it extracts the inspection item relating to chain mounting of the tires. For example, when the destination of the user is a city center, the information processing apparatus 15 does not extract the inspection item relating to the chain mounting of the tires.

The information processing apparatus 15 is not limited to extracting inspection items based on weather of the area including the user's destination, and may extract inspection items based on weather of the area including traveling route of the reserved vehicle 2' to the user's destination. For example, the information processing apparatus 15 acquires information about the traveling route of the reserved vehicle 2' held by the navigation apparatus (not shown) from the vehicle 2. When the weather forecast in a particular section of the entire traveling route is "snow", the information processing apparatus 15 may extract the inspection item on chain mounting of the tires from the inspection item list of the reserved vehicles 2'. In addition, the information processing apparatus 15 may extract inspection items considering duration in which the reserved vehicle 2' travels. For example, when the weather of the user's destination at the user's use starting time is "snow" and the weather forecast of the user's destination at the user's use ending scheduled time is "sunny", the information processing apparatus 15 may not extract inspection items relating to chain mounting of the tires.

By extracting inspection items in a such way, items that do not necessarily need to be inspected every time can be excluded. As a result, the information processing apparatus 15 can create an optimal inspection item list according to the external environments that are supposed to affect the vehicle 2, such as weather or temperature, and can reduce load on the user, including physical load and temporal load on the inspection operations.

In step S642, the information processing apparatus 15 refers to the inspection item list created in the process of step S641 and determine whether there is a inspection item indicating an unperformed inspection operation. When there is an inspection item indicating an unperformed inspection operation, the process proceeds to step S643, and when there is no inspection item indicating an unperformed inspection operation, the process ends the control process of the information processing apparatus 15 in the inspection operation of the reserved vehicle 2'.

When it is determined in step S642 that there is an unexecuted inspection item, the information processing apparatus 15 causes the output apparatus 12 of the terminal 1 (hereinafter referred to as a display) to display the inspection item list, as shown in the drawing 8A. FIG. 8A is an example of a screen displayed on the display of the terminal 1. In the example shown in FIG. 8A, "Tire Pressure", "Tire Tread Pattern", "Tire Cracking" and "Brake Oil" are displayed on the display of the terminal 1 as the inspection items included in the "Inspection Item List". The user can confirm the other inspection items by scrolling downward. The example shown in FIG. 8A also shows that no items have been inspected in all seven inspection items.

In the step S643, the information processing apparatus 15 acquires a captured image of the reserved vehicle 2'. For example, the information processing apparatus 15 displays a message on the display of the terminal 1 requesting the user to direct the imaging apparatus 14 (for example, a camera) to the reserved vehicle 2'. Specifically, the information processing apparatus 15 displays a message on the display of the terminal 1 requesting the user to operate the orientation of the imaging apparatus 14 so that the entire reserved vehicle 2' is displayed. When the user photographs the reserved vehicle 2 with the imaging apparatus 14 according to the content of the displayed image, the information processing apparatus 15 can acquire a captured image showing the current state of the reserved vehicle 2'.

In step S644, the information processing apparatus 15 estimates the user's position relative to the reserved vehicle 2'. For example, the information processing apparatus 15 performs image processing on the captured image of the reserved vehicle 2' acquired in step S644. Then, the information processing apparatus 15 estimates positional relationship between the user and the reserved vehicle 2' (a distance between the user and the reserved vehicle 2', and an angle at which the user is positioned with respect to the specified portion of the reserved vehicle 2') from a size, an orientation, and an angle of the reserved vehicle 2' in the captured image.

In the step S645, the information processing apparatus 15 determines whether or not the position of the user with respect to the reserved vehicle 2' can be estimated at the step S644. The process proceeds to step S646, when the user's position with respect to the reserved vehicle 2' is estimated. On the other hand, the process proceeds to step S655, when the user's position with respect to the reserved vehicle 2' cannot be estimated.

In step S645, the process proceeds to step S646 when the user's position with respect to the reserved vehicle 2' can be estimated. In the step S646, the information processing apparatus 15 determines whether or not the inspection target portion is included in the captured image of the reservation vehicle 2' acquired in step S644. For example, the information processing apparatus 15 performs image processing on the captured image of the reserved vehicle 2' and extracts one or more components of the reserved vehicle 2' included in the captured image. Then, the information processing apparatus 15 refers to the inspection item list of the reserved vehicle 2' and determines whether or not there is an inspection item related to the extracted component to determine whether or not the inspection target portion is included in the captured image of the reserved vehicle 2'. When it is determined that the captured image of the reserved vehicle 2 includes the inspection target portion, the process proceeds to step S647, and when it is determined that the captured image of the reserved vehicle 2 does not include the inspection target portion, the process proceeds to step S652.

Figure 8B:
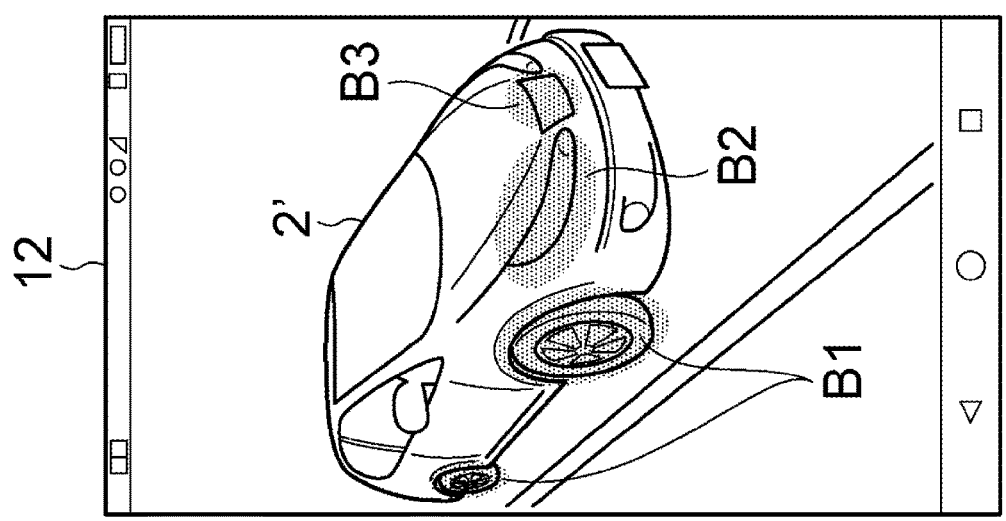
FIG. 8B is an exemplary screen displayed on the terminal by information processing apparatus in the steps shown in FIG. 7.
Figure 9A:
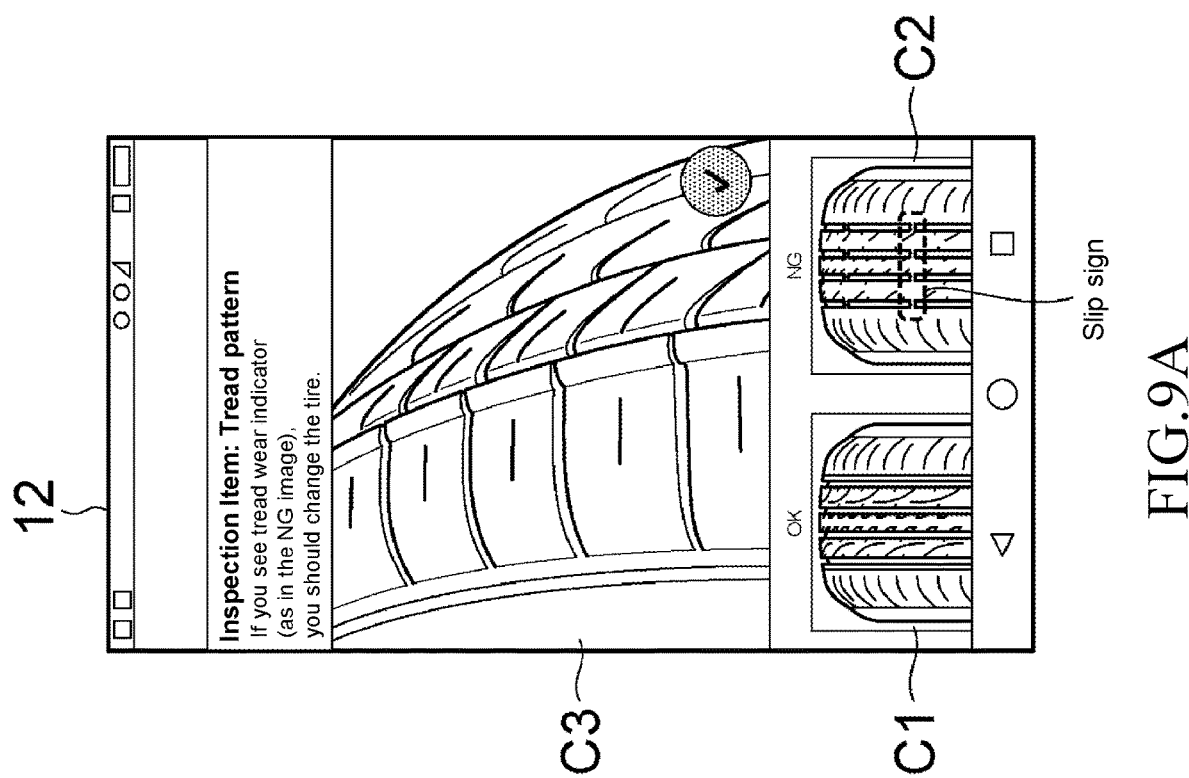
FIG. 9A is another example of a screen displayed on the terminal by information processing apparatus in the steps shown in FIG. 7.
Figure 9B:
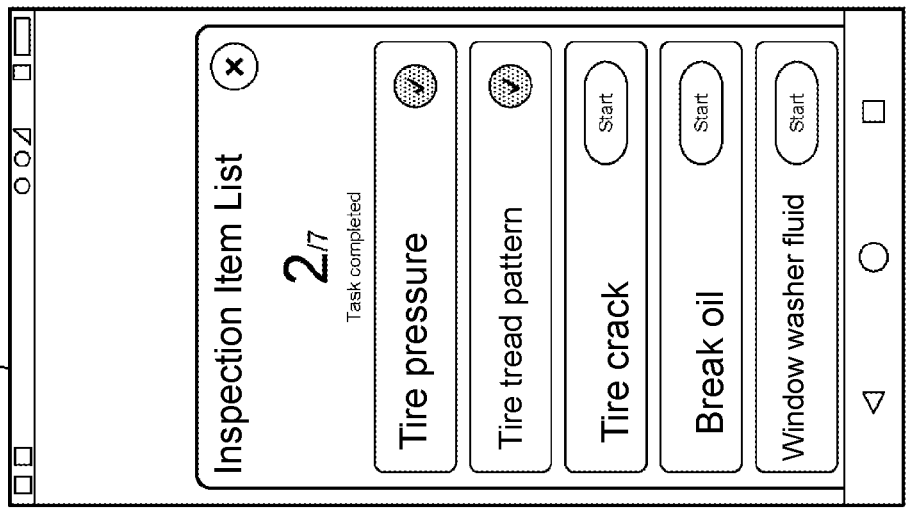
FIG. 9B is another example of a screen displayed on the terminal by information processing apparatus in the steps shown in FIG. 7.

When it is determined that the inspection target portion is included in captured image of the reserved vehicle 2' in step S646, as shown in FIG. 8B, the information processing apparatus 15 highlights the inspection target portion in the captured image of the reserved vehicle 2' displayed on the display of the terminal 1. Specifically, the information processing apparatus 15 superimposes figures having a color (for example, a fluorescent color) including components to be inspected on the component displayed on the display. FIG. 8B is an example of a screen displayed on the display of the terminal 1 when the user is capturing the reserved vehicle 2' by the imaging apparatus 14 of the terminal 1. The example of FIG. 8B shows that captured image captured by the imaging apparatus 14 includes "tires" (the portion where marked with B1), "headlight" (the portion where marked with B2), and "engine" (the portion where marked with B3) as inspection target portions.

In step S646, when it is determined that the inspection target portion is included in the captured image of the reservation vehicle 2' in step S646, the process proceeds to step S647. In step S647, the information processing apparatus 15 displays inspection items corresponding to the inspection target portions included in the captured image of the reserved vehicle 2 on the display of the terminal 1. For example, the information processing apparatus 15 extracts the corresponding inspection item from the inspection item list of the reserved vehicle 2' and displays it on the display of the terminal 1.

As shown in FIG. 8B, when the captured image of the reserved vehicle 2' includes a plurality of inspection target portions, the information processing apparatus 15 executes the process so that the inspection items are displayed in the order according to the priority. Here, the criterion of how the inspection item are displayed for a plurality of inspection target portions is not particularly limited. For example, a particular inspection item selected by the user may be displayed on the display of the terminal 1.

Figure 8C:
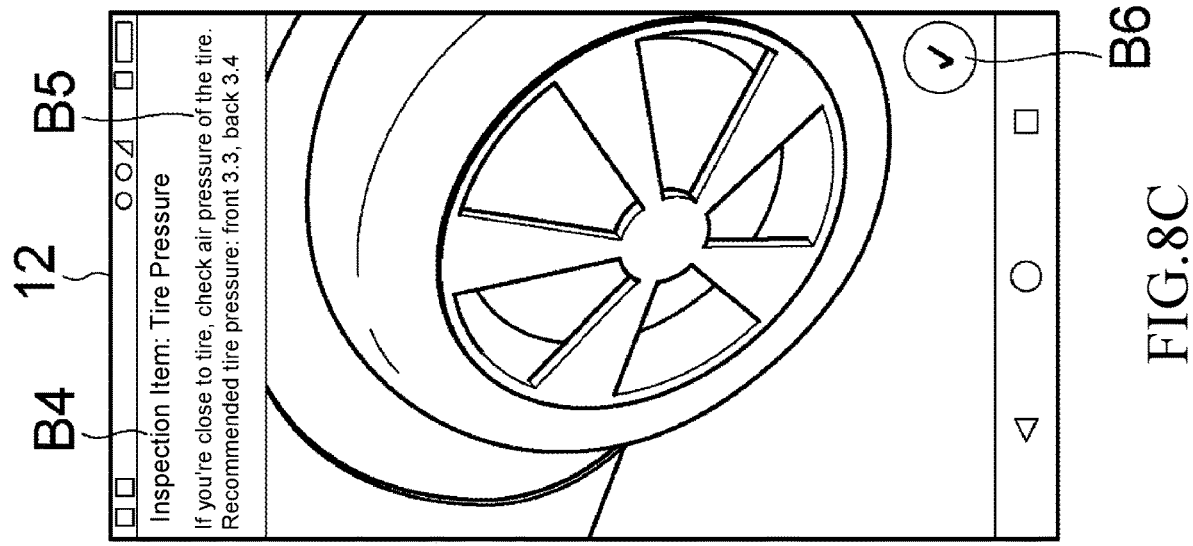
FIG. 8C is an exemplary screen displayed on the terminal by information processing apparatus in the steps shown in FIG. 7.

FIG. 8C is an example of a screen displayed on the display of the terminal 1 when the user is photographing the front wheel of the reserved vehicle 2' by the imaging apparatus 14 of the terminal 1. As shown in FIG. 8C, the information processing apparatus 15 superimposes the inspection item of the "tire pressure" and the confirmation content on the captured image of the front wheel of the reserved vehicle 2' to display this information on the display of the terminal 1. By displaying the inspection item B4 and the confirmation content B5 on the images currently taken by the user, the user can recognize which component of the reserved vehicle 2' corresponds to the inspection item at first glance. In the example of FIG. 8C, when the inspection operation is completed, the user touches the confirm button (the portion indicated by B6) displayed at the lower right of the screen, whereby the information processing apparatus 15 can specify that inspection item of the "tire pressure" is completed. In other words, the screen shown in FIG. 8C continues to be displayed on the display of the terminal 1 until the user touches the confirmation button. Here, although FIG. 8C illustrates the screen of the display of the terminal 1 displayed when the user is capturing the front wheel of the reserved vehicle 2' by the imaging apparatus 14 of the terminal 1, the information processing apparatus 15 may use the zoom function of the imaging apparatus 14 to enlarge the front wheel of the entire image of the reserved vehicle 2' shown in FIG. 8B and display the enlarged front wheel on the display of the terminal 1.

In step S648, the information processing apparatus 15 determines whether or not there is vehicle information related to the inspection item displayed in step S647. For example, the information processing apparatus 15 refers to the confirmation contents included in the inspection item list and determines whether the inspection item provided to the user is an inspection item to be inspected using vehicle information. The information processing apparatus 15 determines that there is relevant vehicle information when the confirmation content of the inspection item is a content that causes the user to confirm the vehicle information. On the other hand, when the content of the inspection item confirmation is not a content that causes the user to confirm the vehicle information (for example, an item that cause the user to visually confirm an injury of the vehicle body), the information processing apparatus 15 determines that there is no relevant vehicle information. When it is determined that there is relevant vehicle information, the process proceeds to step S649, and when it is determined that there is no related vehicle information, the process proceeds to step S650.

When it is determined that there is relevant vehicle information in step S648, the process proceeds to step S649. In step S649, the information processing apparatus 15 displays the vehicle information of the reserved vehicle 2' on the display of the terminal 1. For example, the information processing apparatus 15 displays the vehicle information of the reserved vehicle 2' on the display of the terminal 1, the vehicle information superimposed on the captured image or the enlarged captured image of the reserved vehicle 2' acquired in the step S643.

Figure 8D:
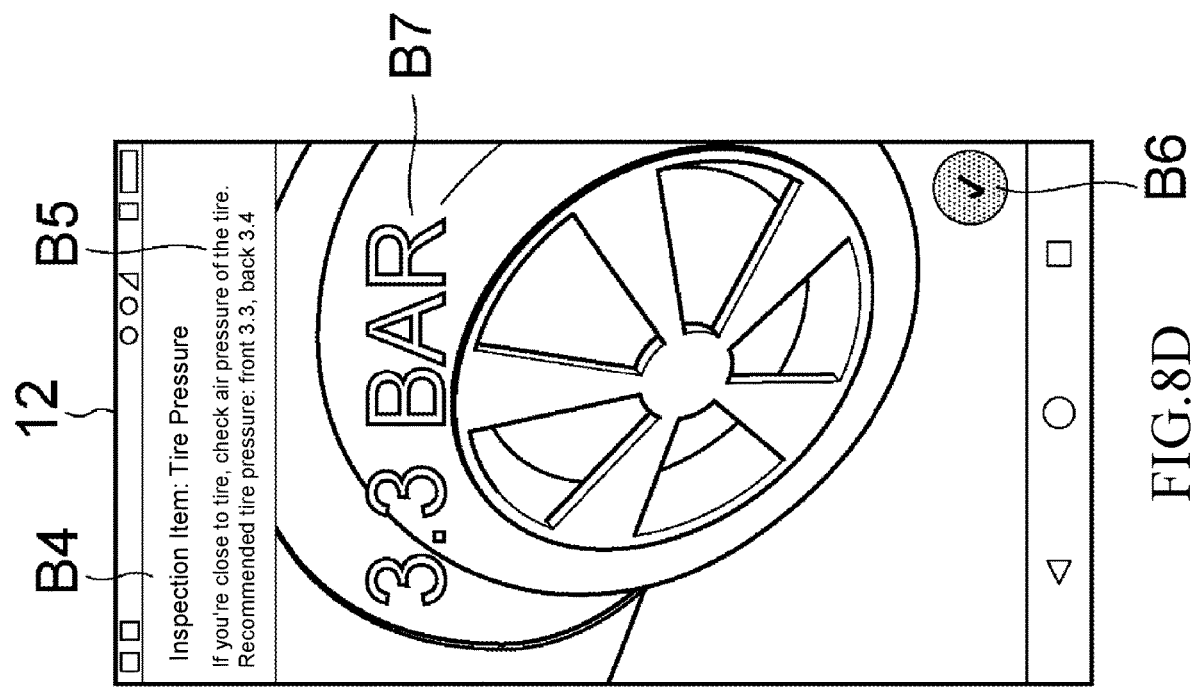
FIG. 8D is an exemplary screen displayed on the terminal by information processing apparatus in the steps shown in FIG. 7.

FIG. 8D shows an example of a screen showing vehicle information, which is air pressure of a tire, displayed on the screen shown in FIG. 8C. As shown in FIG. 8D, the information processing apparatus 15 superimposes the numerical value of the air pressure of the tire (the portion indicated by B7) on the captured image of the tire of the reserved vehicle 2' shown in FIG. 8C, and displays the superimposed value on the display. FIG. 8D shows an example of air pressure of the tire with no problem. Thus, for example, a technique for overlaying information of air pressure of the tire of the reserved vehicle 2 on the reserved vehicle 2 visible through the terminal 1 is AR (Augment Reality). The information processing apparatus 15 uses AR techniques to present the air pressure of the tire of the present reserved vehicle 2' to the user so that the user can intuitively understand the status of the tire being captured. Further, the user can easily determine whether or not the numerical value of the air pressure of the tire is within a normal range according to the confirmation content displayed on the screen.

In step S650, the information processing apparatus 15 determines whether or not the confirmation by the user has been completed. The confirmation by the user is, for example, a confirmation of a numerical value (vehicle information), a confirmation of a pattern or a color, a confirmation of lightness or the like. When the user confirms the confirmation content associated with the inspection item, the user executes an operation to indicate to the terminal 1 that the confirmation has been completed. As a result, the information processing apparatus 15 can determine that the user has completed the confirmation through the input apparatus 11. When it is determined that the confirmation by the user has been completed, the process proceeds to step S651, and when it is determined that the confirmation by the user has not been completed, the process returns to step S649.

In the example of FIG. 8D, the user determines that there is no problem with air pressure of the tire and touches the confirmation button B6 to complete the inspection operation of the "tire pressure". The information processing apparatus 15 detects switching of the displays of the confirmation buttons B6, and can determine that the confirmation by the user has been completed. Although in the FIGS. 8C and 8D, an operation in which the user touches B6 has been described as an example in which the user operates after completion of the confirmation, the present invention is not necessarily limited to this. For example, the information processing apparatus 15 may display "OK" and "NG" on the display of the terminal 1. When the user touches either "OK" or "NG", the information processing apparatus 15 can determine that the confirmation by the user has been completed. Here, the signs of "OK" and "NG" are merely examples, and are not particularly limited.

In step S650, when it is determined that the confirmation by the user has been completed, the process proceeds to step S651. In step S651, the information processing apparatus 15 updates the inspection result. When the process in step S651 ends, the process returns to step S642. Thereafter, the process is repeated until it is determined that there is no unexecuted inspection item in step S642.

FIG. 9A shows an exemplary screen after the user has confirmed the inspection item of the "tire tread pattern" of the tire. In the case of the inspection item, which is not a numerical value inspection, like the tread pattern of the tire, the information processing apparatus 15 displays an example of the tread pattern of the tire under a normal condition (the portion where C1 is indicated) and an example of the tread pattern of the tire under an abnormal condition (the portion where C2 is indicated) on the display of the terminal 1 at the same time as the captured image of the tire (the portion where C3 is indicated). Thus, the information processing apparatus 15 presents the current state, the normal state and the abnormal state of the tire to the user at the same time, so that the user can quickly confirm the tire state.

As shown in FIG. 9A, the information processing apparatus 15 emphasizes a point where a slip sign appears in the tread pattern of the tires and displays the tread pattern of the abnormal state on the display of the terminal 1. Thus, the feature point indicating that the abnormality has occurred is emphasized so that the user can easily determine whether or not the problem has occurred without worrying about which point to be inspected.

In the step S651, when the inspection item list of the reserved vehicle 2 is updated, as shown in FIG. 9B, the information processing apparatus 15 displays the inspection item list on the display of the terminal 1. The information processing apparatus 15 displays an item for which inspection operation has been performed and an item for which inspection operation has not been performed to be distinguished from each other. The screen shown in FIG. 9B indicates that the two items of all seven inspection items, "Tire Pressure" and "Tire Tread Pattern", have been inspected.

Further, in the step S646, when it is determined that the inspection target portion is not included in captured image of the reservation vehicle 2, the process proceeds to step S652. In step 652, the information processing apparatus 15 refers to the inspection item list of the reserved vehicle 2' and identifies the portion that is closest to the user in the inspection target portions. For example, the information processing apparatus 15 compares the positional information of each of the inspection target points with the estimated positional information of the user, and identifies the inspection target portion positioned at the shortest distance in the linear distance as the inspection target point closest to the position of the user. The method of identifying the inspection target portion closest to the position of the user is not limited to the above method.

In step S653, the information processing apparatus 15 causes the display of the terminal 1 to display a inspection item corresponding to the inspection target portion specified in step S652.

In step S654, the information processing apparatus 15 causes the display of the terminal 1 to display information requesting the user to move to the vicinity of the inspection target portion identified in step S652. The method of prompting the user to move is not limited to display on the display, and may be a method of guiding the name of the inspection target portion and the position of the inspection target portion by voice. Further, the method of prompting the user to move is not limited to displaying the information prompting the user to move on the display of the terminal 1. For example, the information processing apparatus 15 may display the information requesting the user to direct the imaging apparatus 14 of the terminal 1 to the component of the vehicle including the inspection target portion. When the process in step S654 ends, the process returns to step S643.

Further, in the step S645, the process proceeds to the step S655 when the user's position on the reserved vehicle 2' is not estimated. In the step S655, the information processing apparatus 15 displays the inspection item at the top of the inspection item list of the reserved vehicle 2' on the display of the terminal 1.

In step S656, the information processing apparatus 15 guides the user to move to the vicinity of the corresponding inspection target portion in order to allow the user to confirm the inspection item displayed on the display by the process of step S655. The step S656 corresponds to the step S654.

As shown in FIG. 7, the user repeats the inspection operations of the reserved vehicle 2' in accordance with the processes of the step S643-S654 by the information processing apparatus 15 until there is no inspection item indicating an unperformed inspection operation in step S642. These processes can prevent the user from overlooking some of inspection items included in the inspection item list and can prevent the possibility that some of inspection item are not executed. Further, in the step S654, when the image of the reserved vehicle 2 photographed by the user includes no item to be inspected, the user is guided to the inspection target portion (instructed to move or to photograph), so that even a novice relating to the inspection operation can surely perform the inspection operation.

As described above, the information processing apparatus 15 according to the present embodiment includes the detection unit 151 for detecting that the user approaches the vehicle 2 by a predetermined distance or less, the inspection information acquirement unit 153 for acquiring inspection information on the inspection of the vehicle 2 including an inspection item of the vehicle 2, and the information provision unit 156, based on the detection of the user approaching the vehicle 2 by the detection unit 151, performing a process to provide the inspection information of the vehicle 2 approached by the user to the user. Thus, regardless of the user's recognition for inspection operations of the vehicle 2, the information processing apparatus 15 can provide inspection information to the user based on the detection of the user approaching the vehicle 2. As a result, an unspecified number of users can perform inspection operations of the vehicle 2.

Further, in the present embodiment, the inspection information acquirement unit 153 acquires vehicle information indicating the current state of the vehicle 2 from the vehicle 2 approached by the user. The information provision unit 156 performs a process to provide the vehicle information corresponding to the inspection item in the acquired vehicle information to the user as the inspection information relating to the vehicle 2 approached by the user. Thus, the user can refer to the vehicle information acquired by the in-vehicle sensors 21, and so it is possible to easily confirm the status of the present vehicle 2.

Further, the information processing apparatus 15 according to the present embodiment includes the reservation information acquirement unit 152 that acquires reservation information of the approaching vehicle 2 reserved by the user from the server 3. As a result, even if the vehicle 2 is used by an unspecified number of users, such as a vehicle of a car sharing system or a robot taxi, the user can perform an inspection operation.

In addition, the information processing apparatus 15 according to the present embodiment includes the captured image acquirement unit 154 for acquiring captured image from the imaging apparatus 14 capable of capturing an image of the vehicle 2. The information provision unit 156 displays composite information on the display, the composite information being composed of a captured image of the vehicle 2 approached by the user in a captured image acquired by the captured image acquirement unit 154 and the inspection information relating to the vehicle 2 approached by the user. Thus, when the user looks at the vehicle 2 through the terminal 1, the state of the vehicle 2 and the inspection information relating to the vehicle 2 can be confirmed at the same time, and so it is easy for the user to understand visually about inspection information to be provided.

Further, in the present embodiment, the composite information includes the inspection information corresponding to the at least one component of one or more components of the vehicle 2 and the captured image of the vehicle, and the at least one component is recognized from the captured image of the vehicle 2 in which the user approaches. Thus, the user can inspect the state of the vehicle 2 and inspection information of the components of the vehicle 2 at the same time when looking at the vehicle 2 through the terminal 1. For example, the user can inspect components that are not visible from the exterior, such as an engine, so that the information processing apparatus 15 can reduce load of the user in inspection operations, such as opening the bonnet.

Further, in the present embodiment, the detection unit 151 detects the user approaching the vehicle 2 based on at least one of receiving the user's authentication information from the vehicle 2, performing an unlocking operation on the vehicle 2, and the position of the information processing apparatus 15 being located within a predetermined distance from the vehicle 2. Thus, for example, even if the vehicle 2 is not a vehicle owned by the user, the detection unit 151 can accurately detect the user approaching.

In addition, in the present embodiment, the inspection information acquirement unit 153 acquires inspection information relating to the vehicle 2 from the vehicle 2 that the user approaches. Since the terminal 1 and the vehicle 2 can constitute the inspection system of the vehicle, the present invention can be applied between the user which is the owner of the vehicle 2 and the owned vehicle. As a result, the user can perform inspection operation with respect to not only the vehicle 2 used by an unspecified number of users but also the vehicle 2 used by a specific user.

In addition, the information processing apparatus 15 according to the present embodiment includes a inspection result recording unit for transmitting information to the server 3, the information associating the inspection item provided to the user by the information provision unit 156 with the vehicle information acquired by the inspection information acquirement unit 153 and indicating the current state of the vehicle 2. Thus, the server 3 can perform detailed diagnoses of the inspection records based on vehicle information associated with inspection items. Consequently, the inspection system of the vehicle 100 can inspect the vehicle 2 from different points of view and perform highly accurate inspections.

In addition, in the present embodiment, the inspection information of the vehicle 2 includes information of an inspection procedure of the vehicle 2. As a result, even a user who has no experience of the inspection operation, a user who has little experience of the inspection operation, or a user who has poor understanding of the specification of the vehicle 2 can smoothly perform the inspection operation according to the procedure.

In addition, the information processing apparatus 15 according to the present embodiment includes the inspection request accepting unit 155 accepting an inspection request of the vehicle 2 from the vehicle 2 or a user. The information provision unit 156 performs a process of provide the inspection information relating to the vehicle requested for inspection to the user based on inspection request of the vehicle 2 accepted by the inspection request accepting unit 155. Thus, for example, when the user feels an abnormality of the vehicle 2 while the user is using the vehicle 2, the inspection operation of the vehicle 2 can be promptly started.

In addition, in the present embodiment, the detection unit 151 detects that the user being away from the vehicle 2 by a predetermined distance or more. The information provision unit 156 performs a process to provide the inspection information of the vehicle 2 that the user has been away from to the user based on that the detection unit 151 detecting the user being away from the vehicle 2. Thus, for example, in the car sharing system, even when the user does not recognize that the vehicle 2 is to be inspected, the user can perform the inspection operation of the vehicle 2 after the use of the vehicle 2.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, a program executed by the control apparatus 150 is described using a program stored in a ROM that is a storage apparatus 158 as an example, but the storage location of the program may be external to the information processing apparatus 15. For example, a program executed by the control apparatus 150 may be stored in a computer-readable recording medium. In this case, the control apparatus 150 can execute the program recorded on the recording medium by connecting the recording medium and the terminal apparatus 1 using some method or standard.

In the embodiment described above, it is exemplified that the vehicle information of the reserved vehicle 2' is received in advance before the inspection operation by the user is started, and thereafter, when the vehicle information corresponding to the inspection item is included in the vehicle information, the vehicle information is provided to the user each time the inspection operation by the user is started. Further, the timing of receiving the vehicle information of the reserved vehicle 2' is not limited to this timing. For example, the information processing apparatus 15 may transmit a request signal for acquiring vehicle information corresponding to inspection item to the reserved vehicle 2' via the communication apparatus 13 at a time when the user is provided with inspection item when the provided inspection item indicates an inspection operation requiring vehicle information. In this case, the vehicle information corresponding to inspection item is transmitted to the information processing apparatus 15 from the reserved vehicle 2' at the timing when inspection item is provided to the user, so that the information communication volume is suppressed. As a result, even when a network having a small communication capacity is used, the user can perform an inspection operation.

Further, in the embodiment described above, inspection result recording unit 157 transmits the inspection result to the server 3 after the inspection operation by the user is completed, and the inspection result is recorded in the database 31. Further, the medium on which the inspection results are recorded is not limited to the database 31 of the server 3. For example, inspection result recording unit 157 may store the inspection result in the storage apparatus 158 included in the information processing apparatus 15. In this case, the information processing apparatus 15 can quickly compare the inspection results of the inspection operation performed prior to the use of the reserved vehicle 2' with the inspection results of the inspection operation performed after the use of the reserved vehicle 2' after the user uses the reserved vehicle 2'. Therefore, for example, the information processing apparatus 15 can acquire additional information about inspection item with a large amount of change before and after use from the reserved vehicle 2' without time. Consequently, an external diagnostic apparatus (not shown) accessible to the information processing apparatus 15 or the storage apparatus 158 can perform detailed diagnosis of the reserved vehicle 2' without having to wait for a while after the use of the reserved vehicle 2' is completed.

In addition, in the present embodiment, in S641 of steps shown in FIG. 7, the information processing apparatus 15 extracts inspection item, but the process for optimizing the inspection item lists is not limited to inspection item extraction. For example, the process for optimizing the inspection item lists may be the deletion of inspection item. For example, the information processing apparatus 15 may remove unwanted inspection item from the list of reserved vehicle 2' preset based on weather information of the area including the standby station of the reserved vehicle 2' or the area including the user's destination .

In addition, in the present embodiment, in the drawing 8B, an exemplary case of highlighting a component corresponding to the inspection target portion in the entire image of the reserved vehicle 2' is shown, but the method of displaying the inspection target portion is not limited to this example. For example, when captured image captured by the imaging apparatus 14 includes a plurality of inspection target portions, the information processing apparatus 15, the inspection number associated with inspection item, may be displayed superimposed on the corresponding part. As a result, the user can intuitively understand which parts should be inspected in order. Instead of the inspection number, the information processing apparatus 15 may express the inspection order by the brightness of the highlights. For example, the information processing apparatus 15 may brighten the brightness of the highlights superimposed on the component with the lower inspection number compared to the brightness of the highlights superimposed on the part with the higher inspection number. The information processing apparatus 15 may express not only the inspection number but also the order of precedence of inspection item by changing the brightness of the highlights. For example, the information processing apparatus 15 may brighten the brightness of highlights superimposed on components with a higher inspection priority compared to the brightness of highlights superimposed on components with a lower inspection priority.

In this specification, as an aspect of information processing apparatus according to the present invention, the information processing apparatus 15 will be described as an example, but the present invention is not limited thereto.

DESCRIPTION OF REFERENCE NUMERALS

1 . . . Terminal
11 . . . Input apparatus
12 . . . Output apparatus
13 . . . Communication unit
14 . . . Imaging apparatus
15 . . . Information processing apparatus
150 . . . Control unit
151 . . . Detection unit
152 . . . Reservation information acquirement unit
153 . . . Inspection information acquirement unit
154 . . . Captured image acquirement unit
155 . . . Inspection request accepting unit
156 . . . Information provision unit
157 . . . Inspection result recording unit
158 . . . Storage apparatus
2 . . . Vehicle
21 . . . In-vehicle sensors
22 . . . ECU
23 . . . In-vehicle communicating apparatus
3 . . . Server
31 . . . Database
32 . . . Server processing apparatus
33 . . . Server communicating apparatus
100 . . . Vehicle inspection system

The invention claimed is:

1. An information processing apparatus comprising:
a camera;
a communication apparatus capable of communicating over a network; and
a controller communicatively coupled to the communication apparatus and configured to:
authenticate a user approaching a vehicle to be driven by the user using an authentication apparatus mounted on the vehicle and configured to read identification information from a member card of the user using near field communication, wherein the vehicle as approached by the user is identified by the authentication from among one or more vehicles comprising the vehicle, transmit, via the network by the communication apparatus, a signal to unlock the vehicle in response to the user authentication, acquire inspection information comprising at least one inspection item of the vehicle relating to an inspection of the vehicle, wherein the at least one inspection item is based on a vehicle type of the vehicle, acquire vehicle information indicating a current state of the vehicle using at least one sensor of:
  a tire pressure sensor;
  an engine oil temperature sensor;
  an engine cooling water temperature sensor;
  a liquid level sensor; and
  a sensor configured to output a diagnostic trouble code,
    wherein the at least one sensor is disposed on the vehicle, acquire, using the camera, an image of the vehicle, extract, using image processing, one or more inspection targets in the image corresponding to the at least one inspection item, acquire, via the network by the communication apparatus, external environmental information comprising a position of the vehicle, a current date, a current time, weather data, and a temperature according to the position of the vehicle, and display, according to a priority of the at least one inspection item, composite information on a display, the composite information being composed of the image with the vehicle information and the inspection information being superimposed, at least in part, on a corresponding inspection target of the one or more inspection targets, wherein the priority comprises an extraction and ordering of the at least one inspection item based on the external environmental information, wherein, in response to the external environment information indicating that the weather is cold and snowy, the at least one inspection item comprises an inspection item on tires, an inspection item on engine oil, and an inspection item on batteries, and these inspection items are given a high priority in the priority, receive an inspection result in response to the user performing an inspection procedure according to the displayed composite information in order of the priority.

2. The information processing apparatus according to claim 1, wherein the controller is further configured to:
acquire reservation information of the vehicle reserved by the user from a server.

3. The information processing apparatus according to claim 1, wherein the inspection information is acquired from the vehicle.

4. The information processing apparatus according to claim 1, wherein the controller is further configured to transmit a request signal for acquiring the vehicle information to the vehicle based on the inspection information.

5. The information processing apparatus according to claim 1, wherein the controller is further configured to transmit information to a server capable of communicating via the network by the communication apparatus, the information associating the inspection information with vehicle information.

6. The information processing apparatus according to claim 5, further comprising a storage apparatus for storing the information associating the inspection information with vehicle information.

7. The information processing apparatus according to claim 1, wherein the inspection information further comprises the procedure.

8. The information processing apparatus according to claim 1, the controller further configured to accept an inspection request of the vehicle.

9. The information processing apparatus according to claim 1, wherein the controller is further configured to:
detect the user being away from the vehicle by a predetermined distance or more, and
perform, based on a result that the user is away from the vehicle, a process to provide the inspection information of the vehicle from which the user is away.

10. The information processing apparatus according to claim 1, wherein p1 the controller is further configured to output a request signal to the vehicle instructing the vehicle to transmit the vehicle information indicating the current status of the vehicle, wherein the request signal indicates the use of the at least one sensor of the vehicle to detect the vehicle information.

11. The information processing apparatus according to claim 1, wherein the inspection information further comprises a first judgment criterion to be evaluated by the user as part of the procedure.

12. The system according to claim 1, further comprising a camera coupled to the controller and wherein:
the controller is further configured to acquire an image of the vehicle using the camera;
the position of the user relative to the vehicle is determined based on the image.

13. A non-transitory computer-readable medium comprising computer-executable instructions stored thereon that, when executed on a processor, cause the processor to perform steps comprising:
authenticating a user approaching a vehicle to be driven by the user using an authentication apparatus mounted on the vehicle and configured to read identification information from a member card of the user using near field communication, wherein the vehicle is identified by the authentication as approached by the user from among one or more vehicles comprising the vehicle;
transmitting, via a network using a communication apparatus, a signal to unlock the vehicle in response to the user authentication;
acquiring inspection information comprising at least one inspection item of the vehicle relating to an inspection of the vehicle, wherein the at least one inspection item is based on a vehicle type of the vehicle;
acquiring vehicle information indicating a current state of the vehicle using at least one sensor of:
  a tire pressure sensor,
  an engine oil temperature sensor,
  an engine cooling water temperature sensor,
  a liquid level sensor, and
  a sensor configured to output a diagnostic trouble code,
    wherein the at least one sensor is disposed on the vehicle;
acquiring, using a camera, an image of the vehicle;
extracting, using image processing, one or more inspection targets in the image corresponding to the at least one inspection item;
acquiring, via the network by the communication apparatus, external environmental information comprising a position of the vehicle, a current date, a current time, weather data, and a temperature according to the position of the vehicle; and displaying, according to a priority of the at least one inspection item, composite information on a display, the composite information being composed of the image with the vehicle information and the inspection information being superimposed, at least in part, on a corresponding inspection target of the one or more inspection targets, wherein the priority comprises an extraction and ordering of the at least one inspection item based on the external environmental information, wherein, in response to the external environment information indicating that the weather is cold and snowy, the at least one inspection item comprises an inspection item on tires, an inspection item on engine oil, and an inspection item on batteries, and these inspection items are given a high priority in the priority, receiving an inspection result in response to the user performing an inspection procedure according to the displayed composite information in order of the priority.

14. The non-transitory computer-readable medium according to claim 13, the steps further comprising:

acquiring, with a camera, an image of the vehicle, wherein the position of the user relative to the vehicle is determined based on the image.

15. An information processing method for providing information to a user by a computer, the information processing method comprising:

authenticating the user approaching a vehicle to be driven by the user using an authentication apparatus mounted on the vehicle and configured to read identification information from a member card of the user using near field communication, wherein the vehicle is identified by the authentication as approached by the user from among one or more vehicles comprising the vehicle, transmitting, via a network in communication with the computer, a signal to unlock the vehicle in response to the user authentication, acquiring inspection information including at least one inspection item of the vehicle and relating to an inspection of the vehicle, wherein the at least one inspection item is based on a vehicle type of the vehicle, acquiring vehicle information indicating a current state of the vehicle using at least one sensor of:
a tire pressure sensor;
an engine oil temperature sensor;
an engine cooling water temperature sensor;
a liquid level sensor; and
a sensor configured to output a diagnostic trouble code,
wherein the at least one sensor is disposed on the vehicle, acquiring, using the camera, an image of the vehicle, extracting, using image processing, one or more inspection targets in the image corresponding to the at least one inspection item, acquiring, via the network by the computer, external environmental information comprising a position of the vehicle, a current date, a current time, weather data, and a temperature according to the position of the vehicle, and displaying, according to a priority of the at least one inspection item, composite information on a display, the composite information being composed of the image with the vehicle information and the inspection information being superimposed, at least in part, on a corresponding inspection target of the one or more inspection targets, wherein the priority comprises an extraction and ordering of the at least one inspection item based on the external environmental information, wherein, in response to the external environment information indicating that the weather cold and snowy, the at least one inspection item comprises an inspection item on tires, an inspection item on engine oil, and an inspection item on batteries, and these inspection items are given a high priority in the priority, receiving an inspection result in response to the user performing an inspection procedure according to the displayed composite information in order of the priority.

16. The information processing method according to claim 15, further comprising:

acquiring, with a camera comprised by the terminal device, an image of the vehicle, wherein the position of the user relative to the vehicle is determined based on the image.

* * * * *